US012591742B1

US 012591742B1

(12) United States Patent
Zhang et al.

(10) Patent No.: US 12,591,742 B1
(45) Date of Patent: Mar. 31, 2026

(54) INFORMATION EXTRACTION FROM UNSTRUCTURED DOCUMENTS WITH HYBRID RETRIEVAL AUGMENTATION USING MULTI-MODAL LANGUAGE MODELS

(71) Applicant: American International Group, Inc., New York, NY (US)

(72) Inventors: Lei Zhang, New York, NY (US); Christopher Allen Cirelli, Roswell, GA (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 0 days.

(21) Appl. No.: 19/231,383

(22) Filed: Jun. 6, 2025

(51) Int. Cl.
G06F 40/289 (2020.01)
G06V 30/10 (2022.01)

(52) U.S. Cl.
CPC ............ *G06F 40/289* (2020.01); *G06V 30/10* (2022.01)

(58) Field of Classification Search
CPC .............................. G06F 40/289; G06V 30/10

USPC ............................................................ 704/9
See application file for complete search history.

(56) References Cited

U.S. PATENT DOCUMENTS

| 10,896,292 | B1 * | 1/2021 | Norton | ................... | G06V 30/12 |
| 2025/0147993 | A1 * | 5/2025 | Chen | ................... | G06F 16/9024 |

* cited by examiner

*Primary Examiner* — Thierry L Pham
(74) *Attorney, Agent, or Firm* — Foley & Lardner LLP

(57) ABSTRACT

A system for extracting a number of data elements from one or more data sources. Image-based documents are indexed using optical character recognition and a text embedding model to convert the document text to vector embeddings. Relevant portions of the document are identified by comparing the vector embedding of the documents to a vector embedding of a prompt or a request to extract information. The relevant text is mapped to a corresponding page of the documents. The page may be provided to a multi-modal language model for information extraction. The multi-modal language model can process contextual information included in the layout, figures, markings, etc. of the document to extract the information. The system populates an ontological data store based on the response from the language model. Extraction accuracy is improved without significant increases in computations performed by the system.

31 Claims, 8 Drawing Sheets

100

100

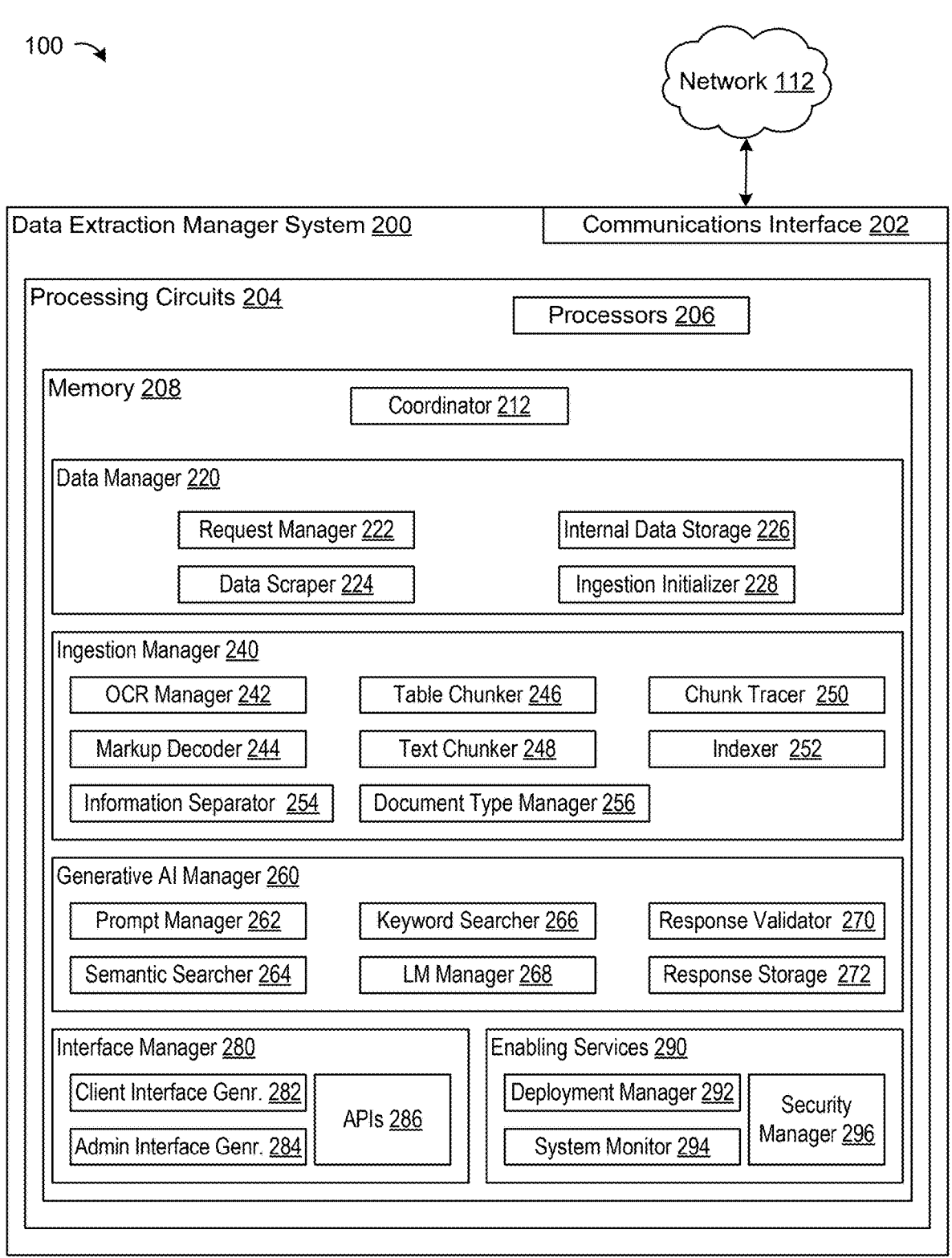

Network 112

Data Extraction Manager System 200 | Communications Interface 202

Processing Circuits 204

Processors 206

Memory 208

Coordinator 212

Data Manager 220

Request Manager 222 | Internal Data Storage 226

Data Scraper 224 | Ingestion Initializer 228

Ingestion Manager 240

OCR Manager 242 | Table Chunker 246 | Chunk Tracer 250

Markup Decoder 244 | Text Chunker 248 | Indexer 252

Information Separator 254 | Document Type Manager 256

Generative AI Manager 260

Prompt Manager 262 | Keyword Searcher 266 | Response Validator 270

Semantic Searcher 264 | LM Manager 268 | Response Storage 272

Interface Manager 280

Client Interface Genr. 282 | APIs 286

Admin Interface Genr. 284

Enabling Services 290

Deployment Manager 292 | Security Manager 296

System Monitor 294

FIG. 2

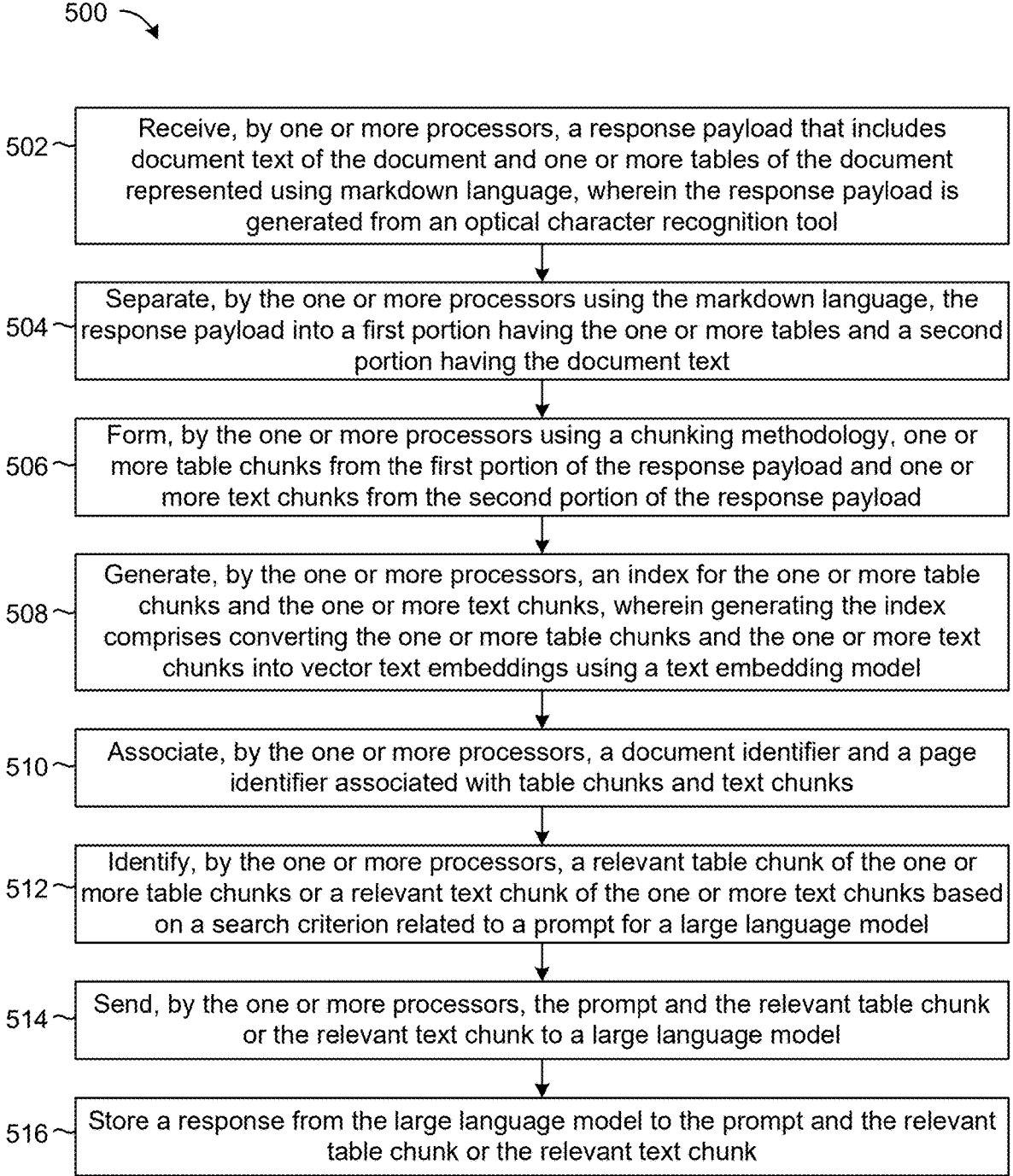

500

502 — Receive, by one or more processors, a response payload that includes document text of the document and one or more tables of the document represented using markdown language, wherein the response payload is generated from an optical character recognition tool 504 — Separate, by the one or more processors using the markdown language, the response payload into a first portion having the one or more tables and a second portion having the document text 506 — Form, by the one or more processors using a chunking methodology, one or more table chunks from the first portion of the response payload and one or more text chunks from the second portion of the response payload 508 — Generate, by the one or more processors, an index for the one or more table chunks and the one or more text chunks, wherein generating the index comprises converting the one or more table chunks and the one or more text chunks into vector text embeddings using a text embedding model 510 — Associate, by the one or more processors, a document identifier and a page identifier associated with table chunks and text chunks 512 — Identify, by the one or more processors, a relevant table chunk of the one or more table chunks or a relevant text chunk of the one or more text chunks based on a search criterion related to a prompt for a large language model 514 — Send, by the one or more processors, the prompt and the relevant table chunk or the relevant text chunk to a large language model 516 — Store a response from the large language model to the prompt and the relevant table chunk or the relevant text chunk

FIG. 4

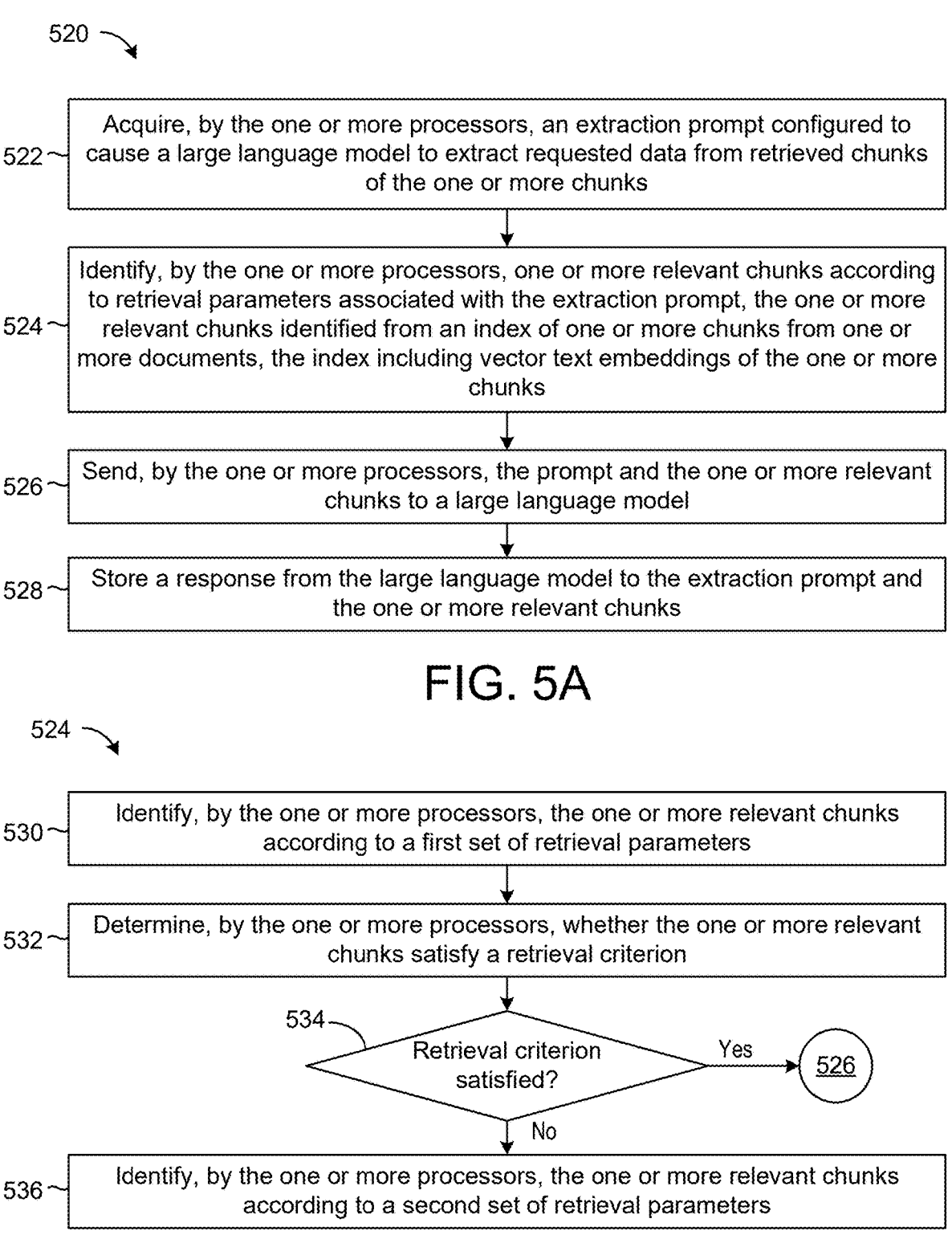

520

522 〜 Acquire, by the one or more processors, an extraction prompt configured to cause a large language model to extract requested data from retrieved chunks of the one or more chunks 524 〜 Identify, by the one or more processors, one or more relevant chunks according to retrieval parameters associated with the extraction prompt, the one or more relevant chunks identified from an index of one or more chunks from one or more documents, the index including vector text embeddings of the one or more chunks 526 〜 Send, by the one or more processors, the prompt and the one or more relevant chunks to a large language model 528 〜 Store a response from the large language model to the extraction prompt and the one or more relevant chunks

530 〜 Identify, by the one or more processors, the one or more relevant chunks according to a first set of retrieval parameters 532 〜 Determine, by the one or more processors, whether the one or more relevant chunks satisfy a retrieval criterion 534 Retrieval criterion satisfied?　　Yes　→　526

No

536 〜 Identify, by the one or more processors, the one or more relevant chunks according to a second set of retrieval parameters

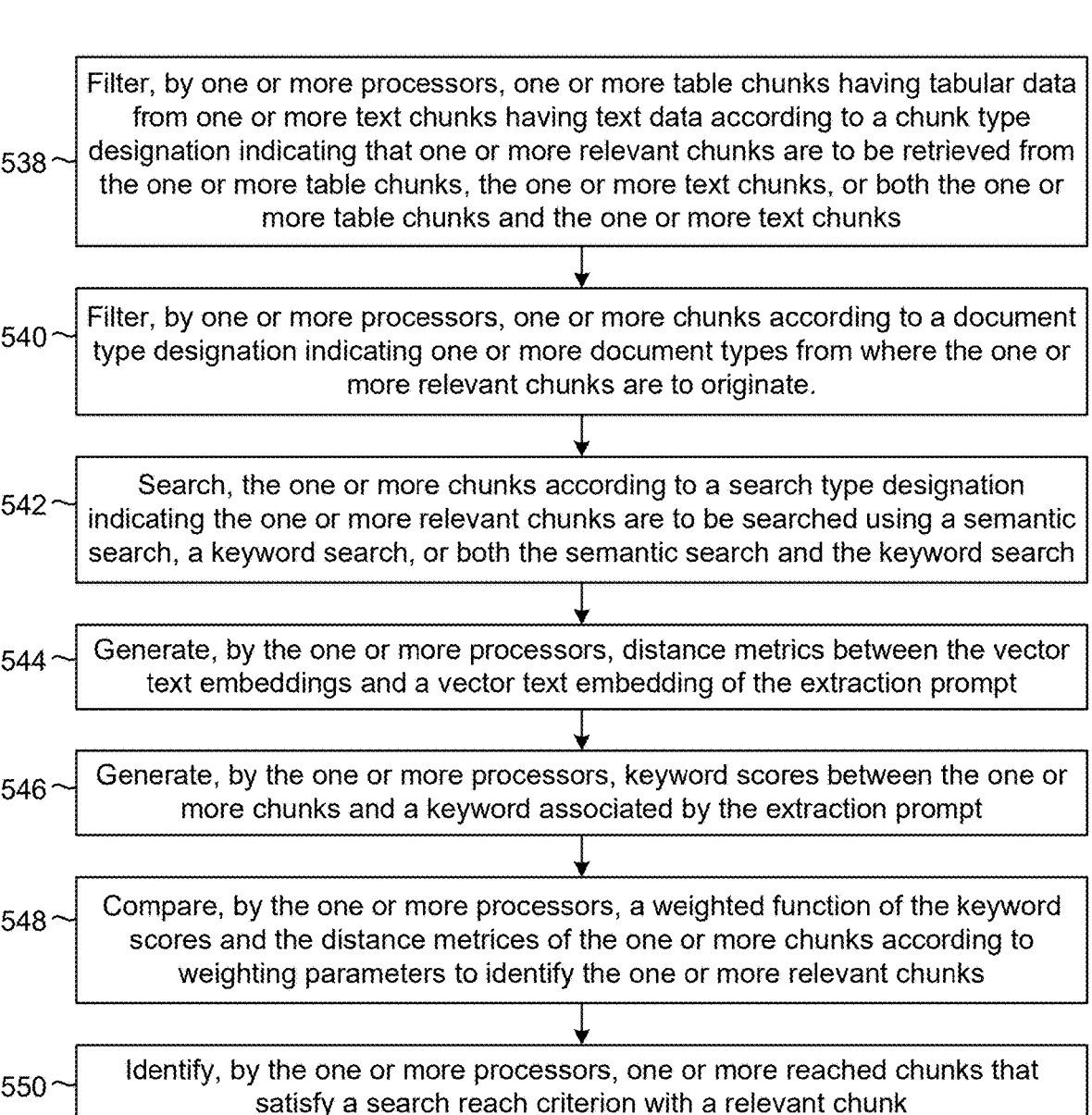

538 — Filter, by one or more processors, one or more table chunks having tabular data from one or more text chunks having text data according to a chunk type designation indicating that one or more relevant chunks are to be retrieved from the one or more table chunks, the one or more text chunks, or both the one or more table chunks and the one or more text chunks 540 — Filter, by one or more processors, one or more chunks according to a document type designation indicating one or more document types from where the one or more relevant chunks are to originate.

542 — Search, the one or more chunks according to a search type designation indicating the one or more relevant chunks are to be searched using a semantic search, a keyword search, or both the semantic search and the keyword search 544 — Generate, by the one or more processors, distance metrics between the vector text embeddings and a vector text embedding of the extraction prompt 546 — Generate, by the one or more processors, keyword scores between the one or more chunks and a keyword associated by the extraction prompt 548 — Compare, by the one or more processors, a weighted function of the keyword scores and the distance metrices of the one or more chunks according to weighting parameters to identify the one or more relevant chunks 550 — Identify, by the one or more processors, one or more reached chunks that satisfy a search reach criterion with a relevant chunk

FIG. 5C

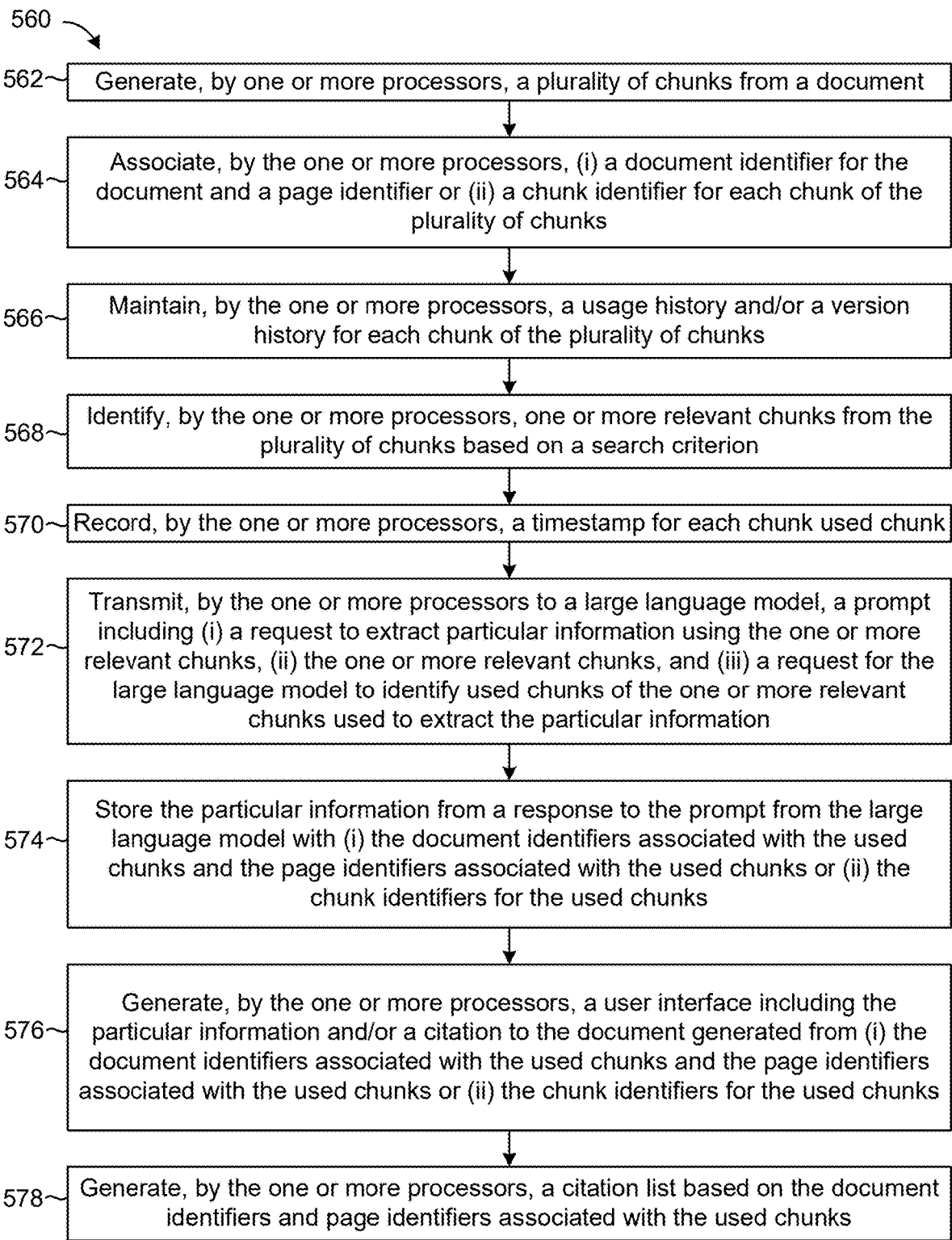

560

562 — Generate, by one or more processors, a plurality of chunks from a document 564 — Associate, by the one or more processors, (i) a document identifier for the document and a page identifier or (ii) a chunk identifier for each chunk of the plurality of chunks 566 — Maintain, by the one or more processors, a usage history and/or a version history for each chunk of the plurality of chunks 568 — Identify, by the one or more processors, one or more relevant chunks from the plurality of chunks based on a search criterion 570 — Record, by the one or more processors, a timestamp for each chunk used chunk 572 — Transmit, by the one or more processors to a large language model, a prompt including (i) a request to extract particular information using the one or more relevant chunks, (ii) the one or more relevant chunks, and (iii) a request for the large language model to identify used chunks of the one or more relevant chunks used to extract the particular information 574 — Store the particular information from a response to the prompt from the large language model with (i) the document identifiers associated with the used chunks and the page identifiers associated with the used chunks or (ii) the chunk identifiers for the used chunks 576 — Generate, by the one or more processors, a user interface including the particular information and/or a citation to the document generated from (i) the document identifiers associated with the used chunks and the page identifiers associated with the used chunks or (ii) the chunk identifiers for the used chunks 578 — Generate, by the one or more processors, a citation list based on the document identifiers and page identifiers associated with the used chunks

FIG. 6

INFORMATION EXTRACTION FROM UNSTRUCTURED DOCUMENTS WITH HYBRID RETRIEVAL AUGMENTATION USING MULTI-MODAL LANGUAGE MODELS

FIELD

This disclosure generally relates to using language models to extract information.

BACKGROUND

Retrieval augmentation generation (RAG) is a technique by which a prompt for information is augmented with relevant content to provide additional context to a language model. RAG systems use embedding models to create an embedding vector that can serve as a key in an index of content that may be used to augment the prompt. A RAG system may search the index based on the prompt to retrieve relevant content. Relevant information may be stored in questionnaires or similar forms including multiple-choice questions, fill-in-the-blank questions, Likert scales, etc.

Multi-modal language models (MMLMs) are configured to process prompts related to multiple types of input, including additional text, images, audio, and other modalities. MMLMs can interpret both the content and the structural or visual cues that provide additional meaning and/or context. MMLMs can analyze text of a document alongside other visual elements, improving semantic understanding and thereby generating improved responses to prompts.

SUMMARY

An embodiment relates to a system for extracting particular information from an image-based document, the system includes one or more processors and one or more one or more tangible, non-transitory memories configured to communicate with the one or more processors. The one or more tangible, non-transitory memories having instructions stored thereon that, in response to execution by the one or more processors, cause the one or more processors to receive a payload that includes document text from the image-based document, wherein the payload is generated from an optical character recognition tool. The one or more processors also generate one or more chunks from the document text. The one or more processors also store, for each respective chunk of the one or more chunks, a corresponding page of the image-based document, the corresponding page including the document text of the respective chunk. The one or more processors also identify a relevant chunk of the one or more chunks based on a search criterion related to a first prompt to extract the particular information. The one or more processors also retrieve the corresponding page for the relevant chunk. The one or more processors also provide the first prompt or a second prompt based on the first prompt to a multi-modal language model, with the corresponding page of the image-based document associated with the relevant chunk. The one or more processors also store a result from the multi-modal language model to the first prompt or the second prompt provided. This summary is illustrative only and not intended to be limiting.

BRIEF DESCRIPTION OF THE DRAWINGS

The features and advantages of the present disclosure will become more apparent from the detailed description set forth below when taken in conjunction with the drawings, wherein like numerals represent like elements.

FIG. 2 is a schematic block diagram of a coordinating system managing operations of the system of FIG. 1, according to some embodiments.

FIG. 4 is a flow of operations for coordinating data extraction and population, according to some embodiments.

FIG. 5A is a flow of operations for coordinating data extraction and population using retrieval parameters associated with a prompt, according to some embodiments.

FIG. 5B is a flow of operations for retrieval augmentation using hierarchical retrieval parameters associated with a prompt, according to some embodiments.

FIG. 5C is a flow of operations for retrieval augmentation using multiple retrieval parameters associated with a prompt, according to some embodiments.

FIG. 6 is a flow of operations for providing traceability and citation of documents used in retrieval augmentation, according to some embodiments.

DETAILED DESCRIPTION

Figure 1:
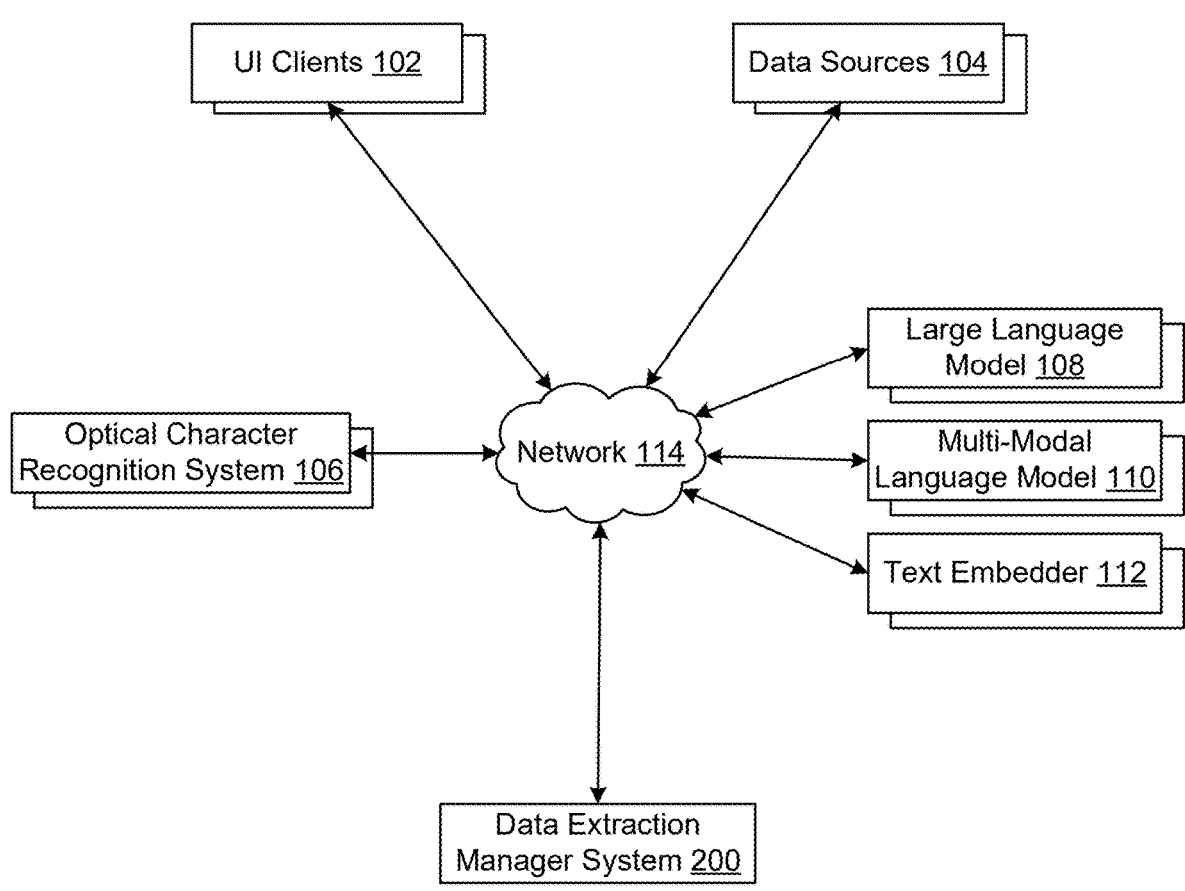
FIG. 1 is a schematic block diagram of a system for data extraction and population using large language models, according to some embodiments.

Different types of businesses often carefully curate and extract a large volume of documents. For example, a large set of insurance documents or accounting documents (in the form of images and/or PDFs) may be sent to an insurance broker or a tax preparer, who then has the task of identifying and extracting relevant information from the accounting documents. To provide more efficiency, businesses have tried to automate this workflow by incorporating template-based optical character recognition (OCR). Businesses have also used rigid, specific rule-based methods. For example, businesses often perform optical character recognition that uses the expected positioning of text on a document to both identify the document type and to further extract and annotate data from that document.

Template-based OCR often includes trained humans to create each template. A human with detailed knowledge of the OCR system and document variability must review every document to specifically create sets of rules detailing exactly how to extract data from each of the documents. Template-based OCR also usually requires trained humans to maintain each template. However, templates often degrade in performance as documents change. While some variability can be explicitly declared in the template, any unaccounted-for changes usually require humans to modify a template to account for the differences or to create a new template.

Moreover, template-based OCR approaches typically cannot adapt to dynamic documents. This can be especially true of documents where a person is expected to provide a response to a request for information within the document. The response may be provided in a large variety of manners for which the template-based OCR system may not be capable of adapting. The response may be provided in various locations, for example, proximate to the request for information, in the margin of the document including the request for information, at the bottom of the page, linked to the request with lines, arrows, and/or other connectors.

These concerns about PDFs and OCRs are even more pronounced when systems feed documents to language models (LMs) using a retrieval-augmented generation (RAG) architecture. RAG-based approaches often make use of two models (e.g., an embedding model and a generative model). The embedding model is used to generate an index for retrieval of portions (e.g., chunks) of the documents. The index may include a vector embedding for each chunk of the documents that can be compared to a vector embedding of a prompt (e.g., a request to extract a particular data element) for retrieval. The prompt and any relevant chunks retrieved may be provided to the generative model, for example, a large language model (LLM) to extract the information requested in the prompt. Documents including human supplied responses to questions (e.g., a form, questionnaire, etc.) can cause inaccuracies for both (i) index generation and chunk retrieval as well as (ii) information extraction.

When chunks are created from the text of the document, the chunks may not include all relevant information for generating and embedding and/or extracting information. For example, in a multiple select question, a question may be posed at the top of a page along with several potential answers. If the possible selections are long enough the chunking strategy may split some of the answers from the question producing multiple chunks for a single question. A chunk may be retrieved based on the semantic analysis of the question but not include the answer. In some scenarios, the LLM may realize the information is not provided and extraction may fail, or the LLM may generate a result based on its pre-training that is inaccurate and not supported by any of the documents (i.e., the LLM may hallucinate a response). Additionally, the chunk may include a potential response that was not selected. Without additional context, the LLM may extract an inaccurate response from the potential answer that was not selected.

In addition, some forms may not provide for text-based answers. For example, a multiple-choice question may be answered in several different ways that can cause OCR systems to fail. The questionnaire may be of fill-in-the-bubble type and the person answering the question may fill in the bubble, mark the bubble, or circle the bubble. In addition, the person may encircle the entire response or write the number of the selection under at the bottom of the page, near the question, etc. The OCR may not be configured to determine which of the responses is selected, and even if it were, the LLM may not be configured to interpret the result as provided by the OCR. Much of the visual context that humans use to interpret a response to similar questions is lost on a system that couples an OCR with an LLM.

An enhanced system may use multi-modal language modals (MMLMs) to better interpret responses found in questionnaires. An MMLM may allow for various types (e.g., modes) of input data. For example, MMLMs can operate on textual input, image-based inputs, audio inputs, etc. In an MMLM-based RAG architecture whole pages may be presented to an MMLM (e.g., as images, image-based document files, etc.) to create vector embeddings representing the semantic meaning of the page (e.g., to create a retrieval index). This allows the RAG system to also create vector embeddings for a new prompt, compare the embedding of the prompt to the vector embeddings of the retrieval index and retrieve relevant pages of the documents based on the comparison (e.g., choose pages having embeddings most similar to that of the prompt). The retrieved pages can then be provided to the MMLM for data extraction. The pages may be provided to the MMLM in an image-based format, for example, to maintain any meaning of markings on the document that are not character based (e.g., encircled selections, bubbles, etc.). However, using an MMLM to create vector embeddings may be financially and computationally expensive. MMLMs may have higher parameter counts, require larger amounts of input data (and thus cause more network traffic), operate on advanced hardware (potentially with larger cooling requirements), and/or have higher operational costs than LLMs.

The present disclosure improves the technological field of RAG-based generative artificial intelligence (AI) systems with a hybrid RAG approach. Documents may be provided to an OCR system and may be broken into chunks. Each chunk may also be stored with a mapping to the page, document, image-based file, etc. that includes the text from the chunk. When a chunk is retrieved (e.g., by semantic search and/or keyword search) the mapping can be used to retrieve the image or image-based file having the text from the chunk (e.g., the whole page, etc.). The image may then be provided to the MMLM for data extraction.

Improvements using the hybrid approach are two-fold. First, the hybrid approach improves traditional RAG approaches by using an MMLM to extract information. The MMLM can extract information from context related to the layout of the text and/or images on the screen. In addition, the MMLM can derive information from non-characters within the document. For example, the MMLM may determine the selection from a set of possible predefined answers or responses (e.g., based on markings on the document) and extract information included in the selected response. The hybrid approach using an MMLM can significantly reduce the number of inaccurate extractions (e.g., hallucinations, incorrect data, etc.). Second, the hybrid approach avoids the computationally demanding need to generate an index using an MMLM in enhanced RAG systems using MMLMs. In particular, pages, images, forms, etc. may only be presented to the MMLM if they are retrieved, potentially eliminating the need to process each document by way of an MMLM, and saving significant computational effort.

To further lessen the amount of data that is processed by the MMLM and thus reduce the computational effort of the system, the documents and/or the chunks can be flagged (e.g., indicated, marked, etc.) for processing by an MMLM or an LLM. The flag or other indication for MMLM processing may be based on a document type, for example. Chunks from first document types (e.g., specifications, emails, etc.) may indicate LLM processing, whereas chunks from second document types (e.g., tables, questionnaires, bar charts, etc.) may indicate MMLM processing.

As a result of the improvements to the RAG-based generative AI systems and methods described herein, a larger portion of the data to be populated can be accurately determined and extracted from the documents, leading to a reduction in labor associated with data correction. The present disclosure leads to an improvement in the functioning of the computer hardware executing the LLM in the form of enhanced accuracy that reduces the need for reprocessing of prompts and/or retrieval of additional documents. Computational effort by the LLM is thus reduced. Moreover, the MMLMs are used only when necessary increasing accuracy without the computational expense of continuous MMLM prompting.

Data Extraction/Population System

FIG. 1 shows a data extraction and population system 100 configured to leverage a language models (LM), for example, one or more large language models (LLMs) 108, one or more multi-modal language models (MMLMs) 110, etc. to extract data from documents and populate data elements (e.g., of a data model, ontological data store, etc.) according to some embodiments. The data extraction and population system 100 is shown to include one or more UI clients 102, one or more data sources 104, an OCR system 106, one or more LLMs 108, one or more MMLMs 110, one or more text embedders 112, and a data extraction manager system 200 communicably connected via a network 114. FIG. 1 shows a non-limiting example of a possible configuration of the data extraction and population system 100. It is contemplated that the various components of the data extraction and population system 100 may be distributed across discrete systems and/or hardware in different ways. For example, a large language model 108 and a text embedder 112 may be configured within the same hardware or same node in a computer cluster or the data extraction manager system 200 may be distributed across multiple elements of computer hardware.

In some embodiments, the general operation of the data extraction and population system 100 is to extract data from documents and populate various data elements, according to some embodiments. The data extraction manager system 200 may gather documents from the one or more data sources 104 and generate a searchable index of documents or portions thereof from the one or more data sources 104 using the text embedder 112. The index generation may be based on the semantic meaning of the documents from the one or more data sources 104, allowing comparison between the entries of the index and a prompt for data (e.g., the prompt also embedded by the text embedder 112). To populate the data elements, the data extraction manager system 200 may generate prompts for the data, identify relevant portions of the documents by searching the index, and provide both the prompt and the relevant portions of the documents to an LM (e.g., the one or more LLMs 108 and/or the one or more MMLMs 110). The LM may then process the prompt with the provided portions of the document to extract (e.g., identify, parse, summarize, combine, generate, etc.) the data requested by the prompt so that the data extraction manager system 200 can store the data (e.g., in an object, a data model, ontological model, an ontological data store, etc.).

In some embodiments, the index is created (e.g., documents from the one or more data sources 104 are ingested) using the OCR system 106 and the text embedder 112. These documents, however, may have significant information included within the context of the text. For example, information may be included in the text layout, the relationship between the text and figures, markings, or other visual data, tabular data, etc. After retrieval, the data extraction and population system 100 may be configured to prompt a MMLM of the one or more MMLMs 110 with the document or portion thereof that was determined to include relevant text. In some embodiments, the data extraction and population system 100 stores an indication (e.g., flag, etc.) with the text used to generate the index that indicates if the text is to be processed by an LLM of the one or more LLMs 108 or by an MMLM. Indicating certain text to be processed by the one or more MMLMs 110 or the one or more LLMs 108 provides additional efficiency for the hybrid RAG approach by using the more computationally expensive MMLM only when required.

In some embodiments, the data extraction and population system 100 gathers large amounts of data from the one or more data sources 104. The one or more data sources 104 may be internal (e.g., on the company intranet) or external (e.g., stored on another company's web server). The one or more data sources 104 may include dedicated databases for particular types of data or webpages from which documents may be compiled, scraped, etc. The one or more data sources 104 may include documents (e.g., files, records, reports, articles, forms, data, etc.). The documents in the database may contain text, tables, columns, rows, charts, graphics, images, and/or other content. The documents may include PDF files or other image-based files for which the text of the document is not readily available for searching, copying, etc. Such image-based files may be processed by the OCR system 106 prior to processing by other components of the data extraction and population system 100. The documents may include a variety of content such as, for example, in the insurance industry, applications, broker correspondence, financials, summary of claims, historical claims filed under business insurance policies ("Loss Run"), questionnaires, forms, applications, and historical claim losses.

The one or more data sources 104 may include image-based documents. Image-based documents may include text, tables, columns, rows, charts, graphics, images, and/or other content. The content of an image-based document may include location information. The location information may relate to a layout indicating the visual appearance of the document and the respective content. For example, image-based documents may include document images (e.g., photographs of documents, scans of documents, bitmap images, portable network graphics, screenshots, etc.), digital documents that include visual content (e.g., PDFs, word-processing documents, webpages, tables, spreadsheets, etc.), and/or digital documents that are entirely or mostly text but include layouts that convey information (e.g., multi-column formatted documents, technical manuals, resumes, profiles, legal documents, contracts, computer, agendas, transcripts, poems, multiple choice questionnaires, etc.). In some embodiments, the documents are processed a portion at a time (e.g., a paragraph, a column, a page, etc.)

In some embodiments, the one or more data sources 104 may include documents that have been filled in (e.g., completed, etc.) by a person digitally or by hand. For example, the one or more data sources 104 may include surveys, applications, forms, questionnaires, registrations, and other types of documents. The documents may include a request for information and a location for a response. The documents may include a request for information along with a list of predefined and/or selectable answers. The document may include one or more multiple choice questions. For example, the document may include questions with selectable answers on the Likert scale, true/false questions, selectable numerical ranges. In some embodiments, the document includes a predefined space (e.g., location, area, etc.) within which the respondent is to enter a response.

A respondent may be sent the document (with requests for information) from the one or more data sources 104. The document may be sent via a postal service, electronic mail, a website, a facsimile machine, etc. The respondent may supply answers to the requests for information in the document electronically and/or in writing. Responses may be provided by entering a response in the predefined space (e.g., digitally or handwritten). In some embodiments, requests with selectable answers (e.g., multiple choice questions) may include responses for which the respondent has marked (e.g., digitally or by hand) the response to the request. For example, the respondent may add a mark proximate the selected response, encircle the selected response, fill in a bubble (e.g., any closed shape such as oval, square, etc.) near the selected response, etc.

In some embodiments, the one or more data sources 104 are configured to receive from the respondents completed (e.g., the response has been provided) documents. For example, the one or more data sources 104 may include an automated email system that, when an email is received, the email is automatically processed by the data extraction manager system 200. Additionally or alternatively, one or more data sources 104 may include an API to which the respondent can upload a scan, an image, and/or a file of completed documents. In some embodiments, the one or more data sources 104 may notify (e.g., inform, communicate, update, etc.) the data extraction manager system 200 that a new document has been received. For example, the data extraction manager system 200 may subscribe to notifications from the one or more data sources 104. Additionally or alternatively, the data extraction manager system 200 may periodically poll the one or more data sources 104 to determine if new documents have been received.

The OCR system 106 may be configured to convert the contents of the document to plain text. The OCR system 106 may include, for example, any commercially available OCR system. Additionally or alternatively, the OCR system 106 may be a component of the data extraction manager system 200 (e.g., using available OCR software). The system may use this type of private OCR system 106 for increased security. The text extraction tool may convert an image-based document (e.g., PDF file, PostScript, tagged image file format (TIFF), etc.) plain text that can be processed by a computer (e.g., the American Standard code for Information Interchange (ASCII)). In some embodiments, the plain text is stored in a plain text file format for later processing. For example, the plain text may be stored in plain text file formats such as TXT or markup languages such as hypertext markup language (HTML), JavaScript Object Notation (JSON), extensible markup language (XML), tau epsilon chi (TeX), etc. (e.g., into a text format (e.g., JSON). JSON is a text format that is completely language independent, but uses conventions that are familiar to programmers. JSON may also be better than OCR because JSON retains positional relationships in the text (positional encoding).

The documents processed by the OCR system 106 may include non-text-based information (e.g., charts, graphs, trend lines, flow charts, or other graphical elements) and/or special text structures (e.g., tables, rows, columns, etc.). This information may be recognized by the OCR system 106 as different from the text of the body of the document and may indicate the presence of special structures (e.g., non-text-based information and/or special text structures) in the output.

The OCR system 106 may return output in the JSON text format. The output may include an object for any special structures in the document with a key-value pair for the location of the special structure within the original document. The key-value pair for the location may include, for example, the X-Y position of each of the four corners for each of the tables in the document or the X-Y position of each cell in the tables, or the key-value pair for the location may include the two X limits of the table and the two Y limits of the table. Each PDF analyzed by a text extraction tool may have the same orientation and coordinates. The X-Y positions may describe a table, row structure, column structure, and/or cell structure.

In some embodiments, the OCR system 106 returns an output with tables inline with the text using a markdown language. The system may use the same markdown symbols to indicate different locations or different markdown symbols to indicate different locations. For example, the first appearance of the markdown symbol indicates the start (or top) of a table and a second appearance of the same markdown symbol indicates the end (or bottom) of the table. The markdown symbols may also indicate a first (e.g., left) side of the table and a second (e.g., right) side of the table. Markdown symbols (e.g., within text) may provide characteristics of the table. The markdown system may provide information to the system, so the system may render the table. For example, the vertical bar or pipe character, 'l', may be used to mark the start of a new column within a row of the table, and the vertical bar followed by a newline character (e.g., 'l/n') may be used to represent a new row. The markdown language may also use hyphen characters, '-', to separate a header row from a content row within a table. When analyzing the position of each cell, the system may consider each cell as having a single row of text, regardless of the number of lines of text in each cell. For more information about markdown symbols, see www-.markdownguide.org/extended-syntax/.

In some embodiments, the OCR system 106 returns an output in a first format, and the data extraction manager system 200 may convert the text into a second format (e.g., a common format) prior to processing by other components of the data extraction and population system 100. For example, the data extraction manager system 200 may convert the JSON output (e.g., with location data) to markdown language that includes markdown symbols. The JSON web language may be translated to markdown text indicating one or more boundaries of the table. Modularity is provided by converting to a common text format (e.g., the markdown language) allowing the data extraction and population system 100 to substitute other various OCR systems 106 if there is a cost advantage, computational advantage, or an improvement by one provider of OCR technology.

In some embodiments, the OCR system 106 is configured to recognize a layout of a document being processed (e.g., ingested, etc.). For example, the document may have more than one column and/or switch between different layout types (e.g., one column to two columns). Recognizing the layout of the document may allow the OCR system 106 to recognize characters and convert them to text in reading order. The OCR system 106 may maintain the semantic content included in word ordering by recognizing the layouts and adjusting appropriately. The OCR system 106 may be configured to recognize figures. The OCR system 106 may not extract any text from figures. For example, text from within a figure may not share semantic meaning with nearby text. Retrieval could be compromised because the text from the figure may be incorrectly included in determining a vector embedding for the text. Additionally or alternatively, the text from figures may be included. In some embodiments, the data extraction manager system 200 can select if text from figures should or should not be included in the output from the OCR system 106. For example, the data extraction manager system 200 may determine if text from figures is to be included in the output from the OCR system 106 based on document type and/or downstream processing selections (e.g., if the document will be processed by an MMLM).

In some embodiments, the OCR system 106 is able to distinguish the difference between handwriting (e.g., handwritten characters) and typeset (e.g., printed characters). The OCR system 106 may output the handwritten characters and the typeset (e.g., from a computer or scan from a printed document) in format that allows the data extraction manager system 200 to have knowledge of what information was typeset and what information was handwritten. For example, the OCR system 106 may include multiple outputs, use markup, and/or generate an output using any other suitable method for providing information to the data extraction manager system 200 related to which text was typeset and which text was converted from handwritten characters.

The OCR system 106 may be configured to recognize whether the document would benefit from being processed by the one or more MMLMs 110. For example, the OCR system 106 may detect figures, tables, annotations, and/or other content that may benefit from image-based (e.g., visual, etc.) processing. The OCR system 106 may communicate the existence of such content to the data extraction manager system 200 so that the data extraction manager system 200 can determine whether the document is to be processed by the one or more MMLMs 110 (e.g., based on a criterion) or the OCR system 106 may indicate to the data extraction manager system 200 that the document would benefit from processing by the one or more MMLMs 110 directly. In some embodiments, the OCR system 106 or data therefrom is used to determine if the one or more MMLMs 110 are to be used during ingestion (e.g., index generation, vector embedding) and/or if the one or more MMLMs 110 are to perform data extraction (e.g., after an appropriate document or portion thereof is retrieved).

In some embodiments, the data extraction manager system 200 is configured to perform some or all of the features of the OCR system 106. The data extraction manager system 200 may be configured to recognize the layout of the document, to recognize figures, and/or to recognize handwritten characters as described previously. The data extraction manager system 200 may communicate the layout, the location of the figures or handwritten characters, etc. to the OCR system 106 to facilitate more efficient character recognition (e.g., text generation, conversion, text extraction, etc.). For example, the OCR system 106 may be configured to translate only certain areas of a document or page, thus allowing the data extraction manager system 200 to provide certain layout information to the OCR system 106.

The data extraction manager system 200 may be configured to coordinate the operations of the data extraction and population system 100. For example, the data extraction manager system 200 may initiate (e.g., at the request of a user of the one or more UI clients 102) document gathering from the one or more data sources 104. The data extraction manager system 200 may communicate (e.g., send, deliver, transmit, etc.) the PDFs or other image-based documents to the OCR system 106 for conversion to plain text. The data extraction manager system 200 may separate the document text from the tabular information before chunking (e.g., splitting text into word lengths that are suitable for retrieval augmentation of, for example, 500 words, 1000 words, 1000 characters, etc.). The data extraction manager system 200 may communicate the chunks (both tabular chunks and text chunks) to the text embedder 112 to build an index for semantic search.

Upon receiving a request from a user of the one or more UI clients 102, the data extraction manager system 200 may generate several prompts for data extraction (e.g., identification, summarization, generation, etc.) for processing by LMs (e.g., one or more LLMs 108 and/or one or more MMLM 110). In some embodiments, the data extraction manager system 200 is configured to embed each prompt (e.g., using the text embedder 112 or similar embedding model) and compare the prompt vector embedding to that of the index to identify and retrieve potentially related or relevant chunks (e.g., portions of the documents). The prompts, along with the identified relevant chunks, may be communicated to the LMs by the data extraction manager system 200. In some embodiments, the data extraction manager system 200 is also configured to store the results of a prompt from the LMs. Thereby, the data extraction manager system 200 manages the population of the particular data elements by retrieving both structured and unstructured data, text, tables, etc. from various sources across the local intranet or the internet.

The data extraction manager system 200 may also generate user interfaces for the data extraction and population system 100. For example, the data extraction manager system 200 may communicate instructions (e.g., JavaScript, Cascading Style Sheets, etc.) to generate a user interface to the one or more UI clients 102. The user interface may provide interactive capability with the systems of the data extraction and population system 100. For example, the user interface may provide the ability to initiate data population, configure the data to populate or extract, view results, trace errors, view source material, and/or other interactions that may be appropriate for a particular use case.

The text embedder 112 may be configured to generate a vector embedding for a chunk of text. The vector embedding may refer to a vector representation of the semantic content of the chunk of text. Vectorization gives text numerical values that can be searched, with computational efficiency, for similarity (e.g., using a distance metric); thereby, text with similar semantic content can be identified for retrieval. Similar words would have similar numerical values. For example, hot and cold may have vectors pointing in different directions. The system may not find the word "cat", but with vectors, the system will determine that lion is similar to cat or big+cat. The text embedder 112 may be trained to understand the meaning of the words (female+king=queen).

After the vectors are created, the text embedder 112 may communicate the vector embeddings of the text chunks to the data extraction manager system 200 for storage in an object (e.g., a vector store). In some embodiments, the text embedder 112 may be included as a component of the data extraction manager system 200.

The LLM 108 may be any type of artificial intelligence (AI) configuration. For example, the LLM 108 may include generative pre-trained transformers (GPT), bidirectional encoder representations from transformers (BERT), text-to-text transfer transformers (T5), recurrent neural networks (RNN), or any other AI architecture suitable for a large language model. The LLM 108 may be configured to output a text response from a textual prompt. For example, the LLM 108 may convert text of a prompt into tokens representing a unit of information (e.g., a character, word, prefix, punctuation, etc.) and use the input sequence tokens to predict each output word (or token) consecutively. The prompt communicated to the LLM 108 may include chunks from the documents gathered from the one or more data sources 104 so that the LLM 108 is able to use that information to generate its response. For example, the LLM 108 may be provided a prompt including a request to determine the range of the market capitalization of a company over the last 6 months and one or more table chunks or text chunks that include information that may be relevant for the request.

The LLM 108 may be a publicly available LLM such as Claude. The LLM 108 may be pre-trained on massive corpora of text data, allowing it to learn the statistical properties of language and predict output text based on the prompt. In some embodiments, the LLM 108 may be fine-tuned, for example, to extract specific data from tabular and/or textual input. Fine-tuning a LLM may refer to the process of taking a pre-trained model and further training it on a specific dataset to adapt it to a particular task or domain. Fine-tuning may allow the LLM 108 to leverage its existing knowledge while improving its performance on the new, specialized data. For example, by focusing on the correlations found in the particular task or domain.

The one or more MMLMs 110 may be designed to process and/or integrate information from various modalities of input (e.g., text, images, audio, video, etc.). In some embodiments, the input layer of the one or more MMLMs 110 includes a channel for each available modality. For example, there may be an audio channel and an image channel. The image channel may also support text represented visually in the document (e.g., on a page, etc.). The one or more MMLMs 110 may encode the different modalities into a common format that can be processed by one or more hidden layers within the one or more MMLMs 110. For example, the one or more MMLMs 110 may include convolutional layers for imaged-based data and/or transformer layers or other attention mechanisms to process textual data. The one or more MMLMs 110 may also include layers that combine (e.g., fuse, integrate, etc.) information across different input modes to generate an output. The output may include similar modalities as the input data. For example, the output may include text, images, audio, video, and/or other relevant formats based on the task and/or the prompt to the one or more MMLMs 110.

The one or more MMLMs 110 may be configured to use the image-based input modality to better understand context of any text on the page. For example, image-based input to the one or more MMLMs 110 may allow the one or more MMLMs 110 to understand the flow (e.g., reading order) of the text within a document. The image-based input may also allow the one or more MMLMs 110 to recognize relationships between figures and/or tables and text within a document. The image based one or more MMLMs 110 may be configured to segment various areas of the document or a page within the document based on relationships between the text, figures, and/or other visual cues. For example, the one or more MMLMs 110 may distinguish handwritten characters from typeset. In some embodiments, the one or more MMLMs 110 are configured to accept input in a specific format or of a specific file type. The data extraction manager system 200 may convert a document from the OCR system 106 to the accepted file type prior to sending the document to the one or more MMLMs 110. For example, a PDF may be converted to a portable network graphic (PNG) prior to communication to the one or more MMLMs 110. Additionally or alternatively, the one or more MMLMs 110 may include pre-processing that converts several different file types to the file type required by the one or more MMLMs 110.

In some embodiments, the documents processed by the data extraction and population system 100 include forms, applications, surveys, etc. for which the document or portion thereof (e.g., page, section, etc.) includes a request for information. The document or portion thereof may also include one or more predefined responses. For example, the document or portion thereof may include multiple-choice, multiple-select, and/or ranking type questions. The one or more MMLMs 110 may be configured to recognize the selections of predefined responses from the respondent to the request for information. For example, the one or more MMLMs 110 may recognize circles around text, check marks, filled in boxes or bubbles, as a selection of the related text. In some embodiments, the MMLM is configured (e.g., trained, fine-tuned, etc.) to determine the portion of the text that represents the request for information (e.g., the question, survey directions, etc.) and determine the text that represents the predefined responses. The one or more MMLMs 110 may be configured or prompted to process (e.g., consider) this information separately when generating a response.

In some embodiments, the one or more MMLMs 110 are used during document ingestion. The data extraction manager system 200 and/or the OCR system 106 may be configured to recognize that the document includes images, figures, layouts, tables, and/or other content that may benefit from processing. For example, the data extraction manager system 200 may consider a trade-off between the added cost and computations of using the one or more MMLMs 110 against the potential for improved retrieval (and therefore extraction) accuracy if the one or more MMLMs 110 are used. In some embodiments, the data extraction manager system 200 may request the one or more MMLMs 110 to create a vector embedding of the document or portion thereof (e.g., page, paragraph, section, etc.). Additionally or alternatively, the data extraction manager system 200 may request the one or more MMLMs 110 to generate a summary (e.g., a text-based summary) of the document or portion thereof. After a summary of the document or portion thereof is generated the one or more LLMs 108 may be used to create a vector embedding for the index.

The one or more UI clients 102 may provide users, administrators, and/or developers of the data extraction and population system 100 access to its features. In some embodiments, the one or more UI clients 102 are used to generate a user interface that allows for interaction with the components of the data extraction and population system 100. For example, the one or more UI clients 102 may be used to initiate data population, configure the data to populate or extract, view results, trace errors, view source material, and/or other interactions that may be appropriate for a particular use case. The one or more UI clients 102 provide various inputs (e.g., selecting user interface objects, entering text into fields, etc.) and various outputs (e.g., display, print, email, or transmission to another system) to/from the data extraction and population system 100.

The network 114 can include routers, switches, antennas, computers, and any other hardware required to communicate information between the components of the data extraction and population system 100 (e.g., from the data extraction manager system 200 to the one or more LLMs 108 or the one or more MMLMs 110). A portion of the network 114 can be wireless and/or a portion of the network 114 can be wired. The network 114 can include one or more networks with routers to facilitate data transfer between the different networks.

In one use case where the data extraction and population system 100 is particularly useful is to extract data for the underwriting process of insurance policies. For example, directors and officers liability insurance and/or environmental insurance require extracting large amounts of information for which there is no central repository. The information may be collected about the company, the directors and officers, and/or any business locations. Manually searching for this information is error prone and requires a large time investment for the underwriters. Moreover, much of the data that is to be extracted for insurance underwriting may be found in financial tables of image-based documents (e.g., PDFs) making the systems and methods of separating tabular information and text information described herein particularly useful in such use cases.

Continuing with the example of insurance underwriting, the user of the data extraction and population system 100 may be an insurance underwriter. They may have a specially curated set of data elements that they require to perform the underwriting process of different types of insurance policies. A type of insurance policy may be considered a task for which the data extraction and population system 100 is configured to populate the data elements of an ontological data store related to that type of insurance policy. The insurance policy may be associated with one subject (e.g., companies, people, buildings, etc.) for which the insurance policy is to be underwritten. After data is populated, the underwriter may review the information and or generate a report. For regulatory purposes, the data used to generate the report may require citation to the source of the information. Systems and methods described herein may allow for such traceability and generation of the appropriate citation.

FIG. 2 shows a block diagram of the data extraction manager system 200, according to some embodiments. In some embodiments, the data extraction manager system 200 is configured to coordinate the processes performed by the data extraction and population system 100 during the data extraction and population. The data extraction manager system 200 of FIG. 2 is shown as a single entity (e.g., hardware). However, it is contemplated that the components and/or instruction sets included in the data extraction manager system 200 could be distributed over any number of computer hardware devices and in any manner of architecture (e.g., local network, cloud-based, etc.).

The data extraction manager system 200 is shown to include a communications interface 202, and one or more processing circuits 204 having one or more processors 206 and memory 208.

The communications interface 202 may be configured to facilitate communication between the data extraction manager system 200 and other components of the data extraction and population system 100. For example, the communications interface 202 may transmit information onto the network 114 and/or receive information from the network 114.

The one or more processors 206 may be general purpose or specific purpose processors, an application specific integrated circuit (ASIC), one or more field programmable gate arrays (FPGAs), a group of processing components, or other suitable processing components. The one or more processors 206 may be configured to execute computer code and/or instructions stored in the memory 208 or received from other computer readable media (e.g., CDROM, network storage, a remote server, etc.). The one or more processors 206 may be configured in various computer architectures, such as graphics processing units (GPUs), distributed computing architectures, cloud server architectures, client-server architectures, or various combinations thereof. A first set of the one or more processors 206 can be implemented by a first device, such as an edge device, and a second set of one or more processors 206 can be implemented by a second device, such as a server or other device that is communicatively coupled with the first device and may have greater processor and/or memory resources.

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. The memory 208 may include database components, object code components, script components, or any other type of information structure for supporting the various activities and information structures described in the present disclosure. The memory 208 may be communicably connected to the processors and can include computer code for executing (e.g., by the processors) one or more processes described herein. For example, many of the components of the data extraction manager system 200 illustrated in FIG. 2 may be implemented as instruction sets stored by the memory 208 and executed by the one or more processors 206.

In FIG. 2, the data extraction manager system 200 is shown to include a coordinator 212, a data manager 220, an ingestion manager 240, a generative AI manager 260, an interface manager 280, and enabling services 290, according to some embodiments. The coordinator 212 may be configured to control the timing and flow of data through the other circuitry of the data extraction manager system 200. For example, the coordinator 212 may cause the modules or circuits to execute in a specific order to perform the function of the data extraction manager system 200. In some embodiments, the coordinator 212 may route the information and/or outputs of other modules that are dependent on the information or use the information as an input.

The data manager 220 may be configured to manage the data gathering process of the data extraction and population system 100, including gathering documents from the one or more data sources 104. The ingestion manager 240 may be configured to identify image-based documents (e.g., PDFs) and coordinate the processing of the image-documents with the OCR system 106. The ingestion manager 240 may also be configured to separate text from other information that may be in documents (e.g., tables, graphs, etc.) and manage the creation of a semantic search index using the text embedder 112. The generative AI manager 260 may be configured to generate prompts (e.g., from templates) to cause an LM (e.g., of the one or more LLMs 108 or the one or more MMLMs 110) to extract data from retrieved documents. The generative AI manager 260 may coordinate the retrieval of relevant portions of documents (e.g., table chunks and/or text chunks) to supply as part of the prompt to the LM. The interface manager 280 may provide for interaction with a user of the data extraction and population system 100 and/or an administrator of the data extraction manager system 200. In some embodiments, the enabling services 290 provide deployment support, security, and monitoring for the data extraction and population system 100.

In some embodiments, the data manager 220 includes a request manager 222, a data scraper 224, internal data storage 226, and an ingestion initializer 228.

In some embodiments, the request manager 222 coordinates the document gathering for a particular task. The request manager 222 may be configured to receive a request to begin data gathering for a particular task. The request manager 222 may, at the request of a user (e.g., through the user interface on the one or more UI clients 102), cause the data scraper 224 to begin searching the one or more data sources 104 for documents that may contain information to be used to populate the data elements or data model. In some embodiments, the request manager 222 may communicate information related to the particular sources of the one or more data sources 104 that should be searched for information. For example, the request manager 222 may receive a set of particular sources of the one or more data sources 104 that should be searched. Additionally or alternatively, the request manager 222 may receive a type of request for which the data scraper 224 has a predetermined list of potential sources. In some embodiments, the request manager 222 may report status back to the user (e.g., to the one or more UI clients 102) in the form of a percent complete. The request manager 222 may also accept individual sources from the user (e.g., from the one or more UI clients 102). For example, the user may provide a data source that the data scraper 224 is not preprogrammed to search. Additionally or alternatively, the user may upload documents to the data extraction manager system 200 that can be stored by the request manager 222 using the internal data storage 226.

The data scraper 224 may be configured to gather information from various sources, including the one or more data sources 104, additional data sources linked by a user (e.g., from the one or more UI clients 102), and/or documents uploaded by the user (e.g., after scanning a hard copy, receiving an email, etc.). The data scraper 224 may search databases, webpages, emails, and other internal and/or external sources of documents (e.g., text, data, image-based documents, etc.). The data scraper 224 may include a list of particular sources of the one or more data sources 104 that are to be searched for a particular task. For example, if the task includes gathering financial information, the data scraper 224 may gather data from Dun and Bradstreet using a POST request or by navigating to a particular web page. Additionally or alternatively, the data scraper 224 may use a web-based search engine (e.g., Google, Bing, etc.) and gather documents (e.g., text, PDFs, etc.) from a number of the top search results (e.g., top 10, top 50, etc.). In some embodiments, the data scraper 224 searches pre-approved websites that are returned from the search engine (e.g., websites that have been vetted to maintain currency and accuracy).

To gather documents, the data scraper 224 may visit a webpage and perform a keyword search or a semantic search to find information that may be used for a particular task. For example, the data scraper 224 may perform a keyword search or a semantic search against the file names of any documents stored in the one or more data sources 104. For plain text documents and/or webpages, the data scraper 224 may identify a keyword or a section that is semantically related to the task and gather the text for a number of words, characters, or sentences before and after the identified area of the text. The data scraper 224 may combine text from multiple identified areas if the resulting text is overlapping. By gathering data both before and after the identified area the data scraper 224 may gather any information that may be useful for populating the data model both in its current form and potentially gathering information for future versions of the data model.

The data scraper 224 may be configured to store the gathered text and/or documents in the internal data storage 226 for processing by the OCR system 106 and/or chunking. In some embodiments, the data scraper 224 searches through all the one or more data sources 104 prior to an index for retrieval augmentation being built. Alternatively, each document may be added to the index as it is gathered, for example, to speed up operations by processing in parallel (e.g., gathering data while building the index) and/or to use internal data storage 226 more efficiently by discarding information that is deemed not useful. In some embodiments, the data scraper 224 may search the one or more data sources 104 until it finds an amount of documentation, or a number of documents related to each search or data that is to be populated. As such, the data scraper 224 may be configured to ensure that the data extraction and population system 100 has a level of information available that is expected to successfully populate all or a threshold percentage of the data.

In some embodiments, the data manager 220 may be configured to periodically (e.g., based on a schedule) search for updates of the documents from the one or more data sources 104. The schedule may be entered by a user (e.g., via a user interface on the one or more UI clients 102). As updates to the documents are found and/or new documents are found, the ingestion manager 240 may add the new information to the retrieval index.

In some embodiments, the internal data storage 226 includes storage for both processed and unprocessed documents. The internal data storage 226 may include a data model and/or an ontology that includes structured storage for documents with properties for the document name, type (e.g., imaged-based, plain text, etc.), source (e.g., from which of the one or more data sources 104), if the document has been chunked, etc. The internal data storage 226 may include storage for each chunk of the documents, with properties that link the source document to enable traceability, the page of the source document from which the chunk is from, a chunk ID (e.g., sequential number, globally unique identifier, GUID, hash code, etc.), if the chunk is a table chunk or a text chunk, etc. The internal data storage 226 may include a vector store to store the vector embeddings of the chunks for the index. The vector store may be maintained separately from the other objects of the data model so as to allow efficient semantic search during retrieval augmentation. The internal data storage 226 may include prompt templates for a particular task or data elements to be populated. For example, the given data population task may include several data elements that are to be populated by the data extraction and population system 100 and the internal data storage 226 may include prompt templates that are used to cause the LM to extract the data from the documents for the particular data element (and thus allowing the data extraction and population system 100 to extract the data elements from the one or more data sources 104). The internal data storage 226 may include the data elements that are to be populated by the data extraction and population system 100. For example, at the initiation of a request (e.g., by the request manager 222) the data elements to be populated may be provided to the internal data storage 226 and populated during the data extraction and population process.

The internal data storage 226 may include storage for all the requests of the data extraction and population system 100 in a single data lake. Additionally or alternatively, a data lake may be generated for each request, providing data isolation and the ability to move the data between systems on a per request basis. The internal data storage 226 may be organized based on request, user id, or any other key to provide efficient operation.

The internal data storage 226 may be any type of non-transitory, computer readable storage medium. For example, internal data storage 226 may store data in magnetic hard disk, solid state drives, optical drives, RAM, and/or any other suitable storage medium. The internal data storage 226 may be distributed across one or more computer system, for example, communicably connected over the network 114.

The system may include remote access to data, standardizing data and allowing remote users to share information in real time. The system may allow users to access data (e.g., data from the database, text from the documents, table data, etc.), and receive updated data in real time from other users. The system may store the data (e.g., in a non-standardized format) in a plurality of storage devices, provide remote access over a network so that users may update the data that was in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system may allow remote users to share data in real time in a standardized format, regardless of the format (e.g. non-standardized) that the information was input by the user. This standardization of data improves communication between devices, improves the functioning of the system and improves the sharing of the data. In particular, the communications are streamlined without having to conduct data conversions because the users and systems may share data (e.g., in real time) in a standardized format.

In some embodiments, the ingestion manager 240 may include an OCR manager 242, a markup decoder 244, a table chunker 246, a text chunker 248, a chunk tracer 250, an indexer 252, an information separator 254, and a document type manager 256. These components may provide functionality allowing the data extraction manager system 200 to identify image-based documents (e.g., PDFs) and coordinate the processing of the image-based documents with the OCR system 106 and prepare the text for retrieval within the RAG architecture of the data extraction and population system 100.

The OCR manager 242 may coordinate the interaction with the OCR system 106. The OCR manager 242 may be configured to receive image-based documents and output plain text files for those image-based documents. For example, the OCR manager 242 may request all unprocessed imaged-based documents from the internal data storage 226 and generate requests for processing by the OCR system 106. The OCR manager 242 may include instructions for communicating the documents to the OCR system 106, tracking their progress, and returning results back into the internal data storage 226. In some embodiments, the OCR manager 242 may have error handling code if the OCR system 106 is not able to appropriately process the documents. For example, the OCR manager 242 may flag the document as unusable, generate a request for the data scraper 224 to obtain additional documents from the one or more data sources 104 that include similar information, and/or use a secondary or back-up OCR system to perform the conversion to plain text.

In some embodiments, the OCR manager 242 may convert the output of the OCR system 106 into a standardized format. The OCR manager 242 may convert the output of the OCR system 106 into plain text using a markdown language to indicate various text structures and/or tables. For example, the OCR system 106 may return plain text in JSON format, and the OCR manager 242 may convert the JSON format into markdown. In some embodiments, more than one OCR system 106 is used, for example, as an alternative if an error occurs or the system is down. The OCR manager 242 may convert all outputs from an OCR system 106 into the format of the primary OCR system 106 or into a common format. In some embodiments, the text information from the one or more data sources 104 contains tables that are not image-based (e.g., Word documents or spreadsheets). Such documents may be provided to the OCR manager 242 for processing into the common markdown even if the document does not require OCR. For example, the OCR manager

242 may be able to read data directly from the Office Open XML (OOXML) structure of the documents. Additionally or alternatively, the OCR manager 242 may be configured to use inter-process communication, object linking and embedding, and/or component object model automation to extract plain text and tables from non-image-based, rich text formats.

The markup decoder 244 may be configured to separate tabular information from text. In some embodiments, the markup decoder 244 uses markdown language to determine information that is tabular and separate from text information. For example, the OCR manager 242 may communicate plain text returned from the OCR system 106 to the markup decoder 244. The plain text may use certain markdown symbols to indicate data as part of a table. In some embodiments, the plain text output of the OCR system 106 includes the vertical bar or pipe character, 'I', to mark the start of a new column within a row of the table, and the vertical bar followed by a newline character (e.g., 'I/n') may be used to represent a new row. The markdown language may also use hyphen characters, '-', to separate a header row from a content row within a table.

The markup decoder 244 may be configured to find certain patterns in the plain text (e.g., with markdown symbols) to determine where a table begins. Regular expressions can be used with wildcards in order to identify a table in plain text (e.g., via a text-based search). For example, the regular expression '\I.*?\I\n\n' may be used to find text (e.g., data, etc.) that is in a row of a table. After finding a row from a table, the markup decoder 244 may generate a new entry in the internal data storage 226 (e.g., a table entry) to store the rows of the table. For example, the rows of the table may be cut from the plain text and moved to the table entry until the next text that does not satisfy the regular expression. After this process, the plain text may have the tabular information removed (e.g., and is ready to be broken into text chunks) and the table entry may have the tabular information.

The table chunker 246 may be configured to generate table chunks from the table entry generated by the markup decoder 244. For example, a table chunk may include the entirety of the table entry. Alternatively, the table chunker 246 may be configured to generate a table chunk including a number of rows of the table entry. For example, the table chunker 246 may break the tables into 50 row chunks or 100 row chunks. The number of rows may be tailored (e.g., through configuration of the data extraction manager system 200) based on a trade-off between the ability for the retrieval process to identify the correct information to send to the LLM 108 and the amount of data that is provided to the LLM 108 and therefore the computational cost, monetary cost, and energy cost of using the LLM 108.

In some embodiments, the table chunker 246 is configured to generate a separate table chunk for the table header. It is contemplated that the table header typically has the most text in a table. In addition, the table header may have text that can be vectorized into an embedding to allow for semantic search of the tables. For example, semantic search may be performed on the headers of each table, and if a header satisfies a similarity criterion during the search, the table or a portion thereof associated with the header may be provided to the LLM 108 during processing of the prompt. The LLM 108 may be configured to understand tabular information in a certain format (e.g., the markdown provided by the OCR system 106, a JSON format wherein each cell is an object with text content or data in ASCII format, a row index, and a column index, or another suitable tabular representation). The table chunker 246 may convert (e.g., transform) the tabular representation of the OCR system 106 or the markup decoder 244 to the tabular representation used by the LLM 108.

The text chunker 248 may be configured to generate chunks of text from the plain text remaining after tables have been removed from the document. A number of text chunks may be generated from a single document. The text chunks may be of a fixed length (e.g., 500 words, 500 characters, 1000 tokens, etc.). The text chunks may be overlapping. For example, the contribution of a set of words to the semantic meaning of a chunk may be higher if the words are in the center of the chunk (e.g., because they are able to use the context of more nearby words) than at the end and therefore chunks may overlap by 50% of the length of the chunks. In some embodiments, the amount of overlap of text chunks is optimized (e.g., offline) and used to configure the data extraction manager system 200. Accuracy of the semantic search retrieval may be calculated for a set of training data (e.g., multiple documents) and used to determine a best amount of overlap or a best fixed length.

The length of the text chunk may be optimized based on an objective that includes a trade-off of the semantic search accuracy the accuracy of the data population LLM 108, and the processing time, computation cost, energy cost, or real cost used to execute the LLM 108. For example, longer text chunks may allow the LLM 108 additional background information during processing, but increase computational expense. Additionally, the accuracy of the semantic search may be poor for both chunks that are short (e.g., too little information) and chunks that are too long (e.g., so much information that the semantic meaning cannot be summarized in the vector embedding). In some embodiments, the length of the text chunk is adaptive, for example, based on the type of request, the data to be populated, the type of document, etc.

In some embodiments, the chunk tracer 250 is configured to add metadata to the text chunks and/or the table chunks. The metadata may be added to improve the document retrieval and/or provide traceability of the data that the LLM 108 extracts. For example, the chunk tracer 250 may associate a flag (or tag) with a chunk indicating the chunk is a table chunk. The flag may be a separate property in the data store (e.g., data model, ontology, etc.) used to store the chunks or the flag may be embedded in the chunk itself. The flag may be a binary flag that includes a True (1) or False (2) value next to a chunk, wherein a value of (1) indicates that the chunk is a table chunk. The flag may found using a regular expression (regexp), for example, "TABLES" may be added to table chunks. The flag may identify which chunk is a table chunk or a text chunk, based on the chunks having a similar table pattern. Adding metadata that indicates whether the table chunk allows the retrieval process to search only tabular information for certain data (e.g., that is known to be stored in tables for the particular field of use, task, etc.).

The chunk tracer 250 may be configured to store a chunk identifier, a document identifier, and/or a page identifier so that if data extraction fails or is questionable, the user is able to trace the source documentation that was used to populate a specific data element. The metadata used for tracing a chunk may be stored as part of the data store and/or the metadata may be stored in the vector store of the index (e.g., keyed based on the location within the vector). Upon failure or request by the user or the one or more UI clients 102, the chunk tracer 250 may return the document chunk identifier, a document identifier, and/or a page identifier. Additionally or alternatively, the chunk tracer 250 may be configured to retrieve the entirety of the chunk text or the table using the identifiers for viewing, verification, or reporting purposes. In some regulated industries, it may be necessary to include the reference material (e.g., as a footnote or citation) to show that the system is accurately populating the data elements and/or is unbiased.

Source documents (e.g., from the one or more data sources 104) may update or change over time. Therefore, it may be advantageous to periodically obtain documents for a specific task (e.g., data population job, etc.). However, if the documents change after some data has been extracted, traceability may be lost. To prevent loss of traceability, the chunk tracer 250 may include with the chunks a creation timestamp and an access timestamp. In some embodiments, the chunk tracer 250 may link chunks from different versions of the same document. The user may be provided with all chunks (e.g., original and updated) related to extracted information, the times the chunks were created, and the times the chunks were accessed, allowing the user to view historical information related to the information extracted and decide if the information should be updated or data extraction should be repeated.

The indexer 252 is configured to create a searchable index of the chunks generated by the table chunker 246 and/or the text chunker 248. In some embodiments, the indexer 252 generates vector embeddings of the text of the chunks. The indexer 252 may coordinate with the text embedder 112 to generate a vector embedding for a text chunk. The vector embedding may refer to a vector representation of the semantic content of the text chunk. Vectorization gives the text chunk numerical values that can be searched, with computational efficiency, for similarity (e.g., using a distance metric); thereby, text chunks with similar semantic content to a prompt can be identified for retrieval. Similar words would have similar numerical values. For example, hot and cold may have vectors pointing in different directions. The system may not find the word "cat", but with vectors, the system will determine that lion is similar to cat or big+cat. The text embedder 112 may be trained to understand the meaning of the words (female+king=queen).

In some embodiments, the table chunks are also indexed by the indexer 252 based on semantic meaning, for example, of their header row. Additionally or alternatively, the indexer 252 may generate an index including full text for the table headers. Full text of table headers allows for more specificity in a search of tabular data. For example, specific headers may always be available in certain types of tables and can be found by keyword search and or regular expressions.

The indexer 252 may return an index including a vector data store for the vector embeddings and/or a separate index for table chunks including the full text of the table headers. The index may be stored in the internal data storage 226 until used by the retrieval augmentation process.

In some embodiments, the indexer 252 is configured to determine if the index creation for a particular document or portion thereof would benefit (e.g., significantly) from processing by the one or more MMLMs 110. For example, the indexer 252 may recognize that the document includes images, figures, layouts, tables, and/or other content that may benefit from spatial context awareness from the one or more MMLMs 110. The indexer 252 may compare an amount of such content and/or consider a trade-off between the added cost and computations of using the one or more MMLMs 110 against the potential for improved retrieval (and therefore extraction) accuracy if the one or more MMLMs 110 are used. In some embodiments, the text embedder 112 may generate a comprehension score (e.g., a coherency score, a logic score, a consistency score, etc.) that represents the level of flow of the words from the document provided to the text embedder 112. The comprehension score may be compared to a threshold value to determine whether a chunk is to be processed by the one or more MMLMs 110. If the comprehension score is greater than the threshold value, the index may be created by producing a vector embedding from the text of the chunk using the text embedder 112. If the comprehension score is less than the threshold value, the portion of the document (e.g., page, etc.) associated with the chunk may be processed by the one or more MMLMs 110 prior to the text embedder 112. For example, the indexer 252 may request that the one or more MMLMs 110 summarize the portion of the document, and then request the text embedder 112 to generate an embedding of the summary for the index.

In some embodiments, the ingestion manager 240 includes an information separator 254. The information separator 254 may be configured to separate text related to the request for information and other text (e.g., text of the response and/or predefined and selectable responses). In some embodiments, the information separator 254 uses characters provided by the OCR system 106 to separate the text of the request from the other text. For example, the information separator 254 may use markup provided by the OCR system 106 and/or recognize sentences ending with a question mark character as at least part of the request. Indexing and therefore document retrieval and data extraction may be improved by separating the text of the request from the other text. For example, if the other text includes predefined answers that can be selected by the respondent, the responses that are not selected may add confounding information that causes the text embedder 112 to generate poor vector embeddings for the document or portion thereof being ingested.

The ingestion manager 240 may include a document type manager 256. The document type manager 256 may be configured to recognize the type of the document. The document type manager 256 may flag each document and/or portion thereof (e.g., chunk, etc.) with the type of document. For example, the type of document may be stored with the metadata of the chunk. Other components (e.g., instruction sets, etc.) of the data extraction manager system 200 may use the document type to configure the method by which the chunk is to be processed (e.g., retrieval parameters, chunking parameters, the LM to be used, etc.). Additionally or alternatively, the document type manager 256 may flag (e.g., add flags to the metadata of a chunk) the type of processing to be performed by the other components of the data extraction manager system 200. The flags may be based on the document type for the chunk and/or one or more additional aspects of the document (e.g., length, existence of figures, etc.) detected during the ingestion process. The flags may be used by the other components in order to select various features for processing of the chunk.

Documents from the one or more data sources 104 may include questions filled in (e.g., completed, etc.) by a respondent. For example, the documents may include surveys, applications, forms, questionnaires, registrations, etc. In some embodiments, the ingestion manager 240 may be configured to determine if the response provided by the respondent is valid (e.g., appropriate, follows the instructions, etc.). The ingestion manager 240 may reject various documents if it is determined that the response was provided incorrectly. Documents may be rejected if more than one answer is selected to a multiple-choice question, if selections are indicated in an inappropriate manner, or based on other situations that may arise from a person filling out a form incorrectly. In some embodiments, the ingestion manager 240 uses the one or more LLMs 108 and/or the one or more MMLMs 110 to determine if the response is valid. The ingestion manager 240, for example, may request that the LM determine an appropriateness score for the response.

If a response is determined to be invalid, the ingestion manager 240 may generate a request for the information to be completed. For example, an email may be created and communicated to the respondent indicating that the response was not accepted. In some embodiments, the document or portion thereof (e.g., page, question, etc.) including the incorrect response is not added to the index. The data extraction manager system 200 may extract the data from other documents of the one or more data sources 104. Additionally or alternatively, the data extraction manager system 200 may wait for the response to be appropriately provided. In some embodiments, the ingestion manager 240 may still add the document or portion thereof with the invalid response to the index and if the document is retrieved with no data extracted the data extraction manager system 200 may indicate that a valid response is required. For example, the system may generate an email to request a new response and/or indicate on a user interface that the obtaining a valid response to the request associated with the missing data may result in an accurate extraction.

In some embodiments, the ingestion manager 240, additionally or alternatively, is configured to determine if any response was provided for a request for information. For example, the ingestion manager 240 may determine whether a question was left blank or whether no selection was indicated. The ingestion manager 240 may perform different remediation based on whether no response was provided or if the response is invalid. For example, if no response is provided, the ingestion manager 240 may generate a new request for information and communicate the request to the respondent, whereas if the response is invalid, the ingestion manager 240 may indicate the chunk for processing by the one or more MMLMs 110 which may be capable of adapting to the unexpected method for responding to the request.

In some embodiments, the generative AI manager 260 includes a prompt manager 262, a semantic searcher 264, a keyword searcher 266, an LM manager 268, a response validator 270, and response storage 272. These components may provide functionality allowing the data extraction manager system 200 to use an LM (e.g., of the one or more LLMs 108 and/or the one or more MMLMs 110) to extract specific data from the documents found by the data manager 220 and processed by the ingestion manager 240 and store that data in the data store.

The prompt manager 262 may populate prompt templates that are stored within the internal data storage 226. For example, the prompt manager 262 may be configured to insert retrieved documents (e.g., by the semantic searcher 264 and/or the keyword searcher 266) into the prompt before the prompts are sent to the LM (e.g., via the LM manager 268). The prompt manager 262 may sequentially process prompts stored in the internal data storage 226 or the prompts may be processed in parallel, e.g., by multiple of the one or more processors 206 on the same or different computer hardware. The internal data storage 226 may store a number of prompt templates, (e.g., to extract data from the documents for each of the data elements to be populated). The prompt manager 262 may select the appropriate prompt templates for the current data population task (e.g., as provided by the user via the one or more UI clients 102).

The prompt manager 262 may use the semantic searcher 264 and the keyword searcher 266 to retrieve chunks (e.g., both table chunks and text chunks) to augment the prompt sent to the LM. The semantic searcher 264 may search based on a similarity criterion or ranking using a distance metric (e.g., Euclidean distance, cosine distance) within the index of vector embeddings produced by the indexer 252. The keyword searcher 266 may search based on one or more other criteria or scores. For example, the keyword searcher 266 may search based on the number of keyword matches or the number of regular expression matches and choose the documents that have the largest number of matches. In some embodiments, the keyword searcher 266 is used for searching the table chunks, whereas the semantic searcher 264 is used to search the vector embedding index. Alternatively, both the keyword searcher 266 and the semantic searcher 264 may be used to search both table chunks and text chunks. For example, a weighted function that combines the similarity scores of the semantic searcher 264 and the matching score of the keyword searcher 266 may be used to score both table chunks and text chunks.

Documents from the one or more data sources 104 may include questions filled in (e.g., completed, etc.) by a respondent. For example, the documents may include surveys, applications, forms, questionnaires, registrations, etc. In some embodiments, the prompt manager 262 may be configured to generate one or more prompts for an LM (e.g., the one or more LLMs 108 and/or the one or more MMLMs 110) to determine if the response provided by the respondent is valid (e.g., appropriate, follows the instructions, etc.). The generative AI manager 260 may reject any response for which the LM indicates the document used to extract the information was a request for information from a respondent and the response was not valid for one or more reasons. For example, the prompt manager 262 may generate a prompt requesting that the LM determines an appropriateness score for the response.

If a response is determined to be invalid, the generative AI manager 260 may cause a request for the information to be generated. For example, an email may be created and communicated to the respondent indicating that the response was not accepted. In some embodiments, the document or portion thereof (e.g., page, question, etc.) including the incorrect response is not added to the index. In some embodiments, the prompt manager 262, additionally or alternatively, is configured to generate a prompt for determining if any response was provided to for a request for information. For example, a prompted LM may determine whether a question was left blank or whether no selection was indicated. Different remediation can be performed based on whether no response was provided or if the response is invalid. For example, if no response is provided, the data extraction manager system 200 may generate a new request for information and communicate the request to the respondent, whereas if the response is invalid, the data extraction manager system 200 may indicate the chunk for processing by the one or more MMLMs 110 which may be capable of adapting to the unexpected method for responding to the request.

In some embodiments, the search criteria, score, and/or distance metric is modified based on the prompt (e.g., the particular data the prompt is requesting the LM to extract). For example, the prompt template may include search (e.g., query, retrieval) parameters such as a type of search and/or parameters for the search that are to be used while performing retrieval augmentation (e.g., while querying for relevant chunks) for a particular prompt. Advantageously, by storing the parameters for the semantic searcher 264 and/or the keyword searcher 266 with the prompt template, the retrieval augmentation can be tailored for each data element that is to be populated by the data extraction and population system 100. For example, a prompt template may indicate that only table chunks should be searched.

In some embodiments, the search performed by the semantic searcher 264 and the keyword searcher 266 is hierarchical. Multiple sets of search parameters may be associated with the prompt or the particular data to extract. The semantic searcher 264 and the keyword searcher 266 may first use a primary (e.g., first, most narrow, etc.) set of search parameters to identify relevant chunks for retrieval augmentation. If the generative AI manager 260 determines that the relevant chunks do not satisfy a retrieval criterion, the semantic searcher 264 and the keyword searcher 266 may use a secondary (e.g., second, broadening, etc.) set of search parameters. For example, the retrieval criterion may include a threshold number of chunks that must be exceeded, a threshold number of words that must be included in the chunks, chunks from at least a number of different document types, or any other desired criterion that may ensure accuracy of the LM's response. In some embodiments, the semantic searcher 264 and the keyword searcher 266 continue to use increasingly broad search/retrieval parameters from the multiple sets until the retrieval criterion is achieved.

After identifying one or more relevant chunks using the semantic searcher 264 and/or the keyword searcher 266, the generative AI manager 260 may provide the one or more relevant chunks to the LM with the prompt. In some embodiments, a search reach criterion may also be used by the generative AI manager 260. The search reach parameter defines a number of chunks related (e.g., adjacent, nearby) to the one or more relevant chunks. For example, for each identified relevant chunk, the generative AI manager 260 may include all the chunks that are from the same page as the identified relevant chunk or all the chunks that satisfy the search reach criterion with the identified relevant chunk. Advantageously, in such a system the chunks generated and stored in the index can be smaller, for example, to have a concise semantic meaning for improved retrieval, and the LM is provided with contextual information adjacent to the relevant chunk to help with information extraction.

The LM manager 268 may coordinate the interaction between the data extraction manager system 200 and the LMs (e.g., of the one or more LLMs 108 and/or the one or more MMLMs 110). The LM manager 268 may be configured to receive populated prompts to communicate to the LM. The LM manager 268 may include instructions for communicating the prompts to the LM, tracking the progress in processing the prompts, causing the results to be validated by the response validator 270, and storing the response (e.g., in the internal data storage 226 and/or the response storage 272). The LM manager 268 may post jobs (e.g., tasks, prompts, etc.) to the LM using an API provided by the LM. Additionally, the LM manager 268 may use the API to request the response to a particular prompt.

In some embodiments, the LM manager 268 may be configured to convert a document from the one or more data sources 104 to a file type suitable for the one or more MMLMs 110 prior to sending the document and/or the prompt. The whole page or other portion (e.g., area, paragraph, etc.) of a document associated with a relevant chunk identified by the semantic searcher 264 and/or the keyword searcher 266 may be retrieved and provided to the LM manager 268 for conversion. For example, a page of a PDF may be converted to a PNG prior to communication to the one or more MMLMs 110. Additionally or alternatively, the one or more MMLMs 110 may include pre-processing that converts several different file types to the file type required by the one or more MMLMs 110.

In some embodiments, the LM manager 268 provides the prompt for information extraction, the one or more relevant chunks (e.g., found by the semantic searcher 264 and/or the keyword searcher 266), and a request for the LM to identify the used chunks that were used by the LM to extract the information. To provide traceability each chunk may be given a unique identifier (e.g., a chunk identifier, a document and page identifier, etc.) and the LM can include in its response the identifier of the chunks used during processing. The identifiers provided to the LM may be globally unique or may be unique only to the current prompt (e.g., if 23 chunks are provided to the LM, the integers 1-23 may be used as unique identifiers related to the scope of that prompt). The used chunks may be stored with the response of the LM to be displayed, reported, cited, etc. for traceability and/or regulatory reasons. Additionally or alternatively, the used chunks may be stored and/or displayed responsive to an error or other undesired condition identified with the LM or the response to the current prompt.

The response validator 270 is configured to check the accuracy of the responses obtained from the LM. The response validator 270 may include various guardrails to ensure that the response is appropriate. Each prompt template may store information about the expected response (e.g., type, length, acceptable range if numeric, etc.) and the response validator 270 may execute checks stored in the prompt template and/or a set of common checks that are executed against all responses. For example, the prompt template may indicate that the response should be numeric, and if the LM returns a response that is not numeric, the response validator 270 can flag the response before storing it in the response storage 272. In some embodiments, the response validator 270 is configured to parse the response from the LM to determine if the response provided by the respondent is valid (e.g., appropriate, follows the instructions, etc.). For example, the response validator 270 may detect text indicating that the respondent's answers to the request for information are not valid. In some embodiments, the prompt manager 262 generates a prompt that indicates the response provided by the LM should be in a particular output format (e.g., to facilitate parsing the prompt and determining whether the respondent answered the request for information appropriately). The response validator 270 may reject any response for which the LM indicates the document used to extract the information was a request for information from a respondent and the response was not valid for one or more reasons.

If a response is determined to be invalid, the generative AI manager 260 may cause a request for the information to be generated. For example, an email may be created and communicated to the respondent indicating that the response was not accepted. In some embodiments, the document or portion thereof (e.g., page, question, etc.) including the incorrect response is not added to the index. In some embodiments, the response validator 270, additionally or alternatively, is configured to determine if any response was provided for a request for information. Different remediation can be performed based on whether no response was provided or if the response is invalid. For example, if no response is provided, the data extraction manager system 200 may generate a new request for information and communicate the request to the respondent, whereas if the response is invalid, the data extraction manager system 200 may indicate the chunk for processing by the one or more MMLMs 110 which may be capable of adapting to the unexpected method for responding to the request.

In response to detecting a potential error, the response validator 270 may store additional tracing information with the response from the LM. Tracing information may include the chunk identifier, the page identifier, and/or the document identifier (e.g., as stored by the chunk tracer 250) from any of the chunks that were provided to the LM as part of the retrieval augmentation process. In some embodiments, the response validator 270 may store the tracing information with all responses even if no error occurs, for example, for display or regulatory purposes.

Responses may be stored in response storage 272 and/or internal data storage 226. In some embodiments, the data extraction manager system 200 stores all data in the internal data storage 226 and there is no independent data store for the data that is being populated by the data extraction and population system 100. The response storage 272 may be of the same type or a different type from the internal data storage 226. The response storage 272 may store data in magnetic hard disk, solid state drives, optical drives, RAM, and/or any other suitable storage medium. The response storage 272 may be distributed across one or more computer system, for example, communicably connected over the network 114.

The interface manager 280 may be configured to allow interaction with the data extraction manager system 200. The interface manager 280 is shown to include a client interface generator 282, an admin interface generator 284, and APIs 286. The client interface generator 282 and/or the admin interface generator 284 may provide instructions to the one or more UI clients 102 (e.g. JavaScript, Cascading Style Sheets) that instruct the one or more UI clients 102 how to generate the user interface within a client application (e.g., an internet browser, a proprietary application, etc.). In some embodiments, the interface manager 280 can provide APIs 286 that cause various functionality of the data extraction manager system 200 to be triggered. For example, the client interface generator 282 may cause the one or more UI clients 102 to generate a user interface that includes checkboxes (e.g., to select the task or the data elements to be populated) and a button to send the request to begin processing. Upon interaction with the button (e.g., a click, etc.) the user interface may use the APIs 286 to post a request to begin processing of the selected task or data elements to be populated.

The client interface generator 282 may include instructions to generate a user interface for user centric operations. The user of the data extraction and population system 100 may also be responsible for validating the data, making decisions based on the populated data, generating reports using the data, etc. and the client interface generator 282 may focus on the user centric operations. The client interface generator 282 may provide instructions for a user interface from which particular data that is to be populated can be selected. In some embodiments, certain task includes groups of data that is to be populated. For example, a task could be "analysis number 1," which includes a particular set of data elements that is to be populated. The client interface generator 282 may provide instructions to allow the user (e.g., via the one or more UI clients 102) to add additional data elements to the list of data that is to be populated.

The client interface generator 282 may also include instructions to allow the user to select an appropriate subject of the analysis. Example subjects include, companies, people, places, or any other subject for which it would be useful to gather large amounts of data from disparate sources. For example, a task may be to extract data to underwrite an insurance contract with a company or to collect financial information related to a publicly traded company. The client interface generator 282 may be configured to allow the user (via the generated user interface) to run a task against several subjects (e.g., for comparison). In some embodiments, the client interface generator 282 provides instructions to generate a user interface that allows the user to schedule requests for extracting the data. For example, the data extraction may be done periodically to account for changes in the data that may have occurred and/or to allow time varying data to be displayed on trendlines, bar charts, radar plots, etc. Additionally or alternatively, the client interface generator 282 may allow the user to schedule multiple subjects to be processed at different times (e.g., to avoid initializing additional cloud computing resources and being charged peak rates).

In some embodiments, instructions communicated to the one or more UI clients 102 from the client interface generator 282 include the ability to view errors that have occurred during the processing of a task. For example, errors detected by the response validator 270 may be displayed on the UI along with any tracing information that may be stored by the chunk tracer 250 with the retrieved chunks used by the LM.

The admin interface generator 284 may have much of the same functionality as the client interface generator 282, for example, with additional configuration ability. For example, the instructions provided by the admin interface generator 284 may allow for the chunk size to be configured during processing. Additionally or alternatively, the admin interface generator 284 may change the parameters (e.g., weighting of a distance metric or a match metric) of the semantic searcher 264 and/or the keyword searcher 266 to adjust how the chunks are retrieved.

The enabling services 290 provide various enabling services, according to some embodiments. The enabling services 290 are shown to include a deployment manager 292, a system monitor 294, and a security manager 296. The components of the enabling services 290 together ensure smooth operation of the data extraction manager system 200 and the data extraction and population system 100.

The deployment manager 292 may be configured to allow developers to deploy new versions of the data extraction manager system 200 while maintaining the data extraction manager system 200 operational. Deployments of the data extraction manager system 200 may be container based, allowing the data extraction and population system 100 to scale the number of servers implementing the data extraction manager system 200 to scale as user demand changes. Requests for processing may be communicated to a first version of the data extraction manager system 200 while an updated second version of the data extraction manager system 200 is generated (e.g., initiated). Once the second version of the data extraction manager system 200 is fully operational, the first version may be decommissioned.

The system monitor 294 may be configured to monitor the operations of the data extraction and population system 100. For example, the system monitor 294 may monitor the request queue and/or memory usage and decide if additional computing environments should be provisioned. For example, the system monitor 294 may determine to add computing resources to the data extraction manager system 200, purchase additional processing or prioritized processing of the OCR system 106, an LM (e.g., of the one or more LLMs 108 and/or the one or more MMLMs), or the text embedder 112. In some embodiments, the system monitor 294 is configured to automatically provision the additional computational power. Additionally or alternatively, the system monitor 294 may generate alerts indicating that the queue is large or processing could otherwise be improved with additional resources. The alerts may be displayed on the admin interface generator 284.

In some embodiments, the security manager 296 is configured to secure data stored within the data extraction manager system 200. The security manager 296 may maintain login information with the request identifiers that are associated with a particular user. In addition, the security manager 296 may associate various roles (e.g., user, admin, developer) with a login.

The security manager 296 may include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server. The filtering tool may identify information or accounts that communicate with the server and associate a request for content with the individual account. The system may include a filter on a local computer and a filter on a server.

Figure 3:
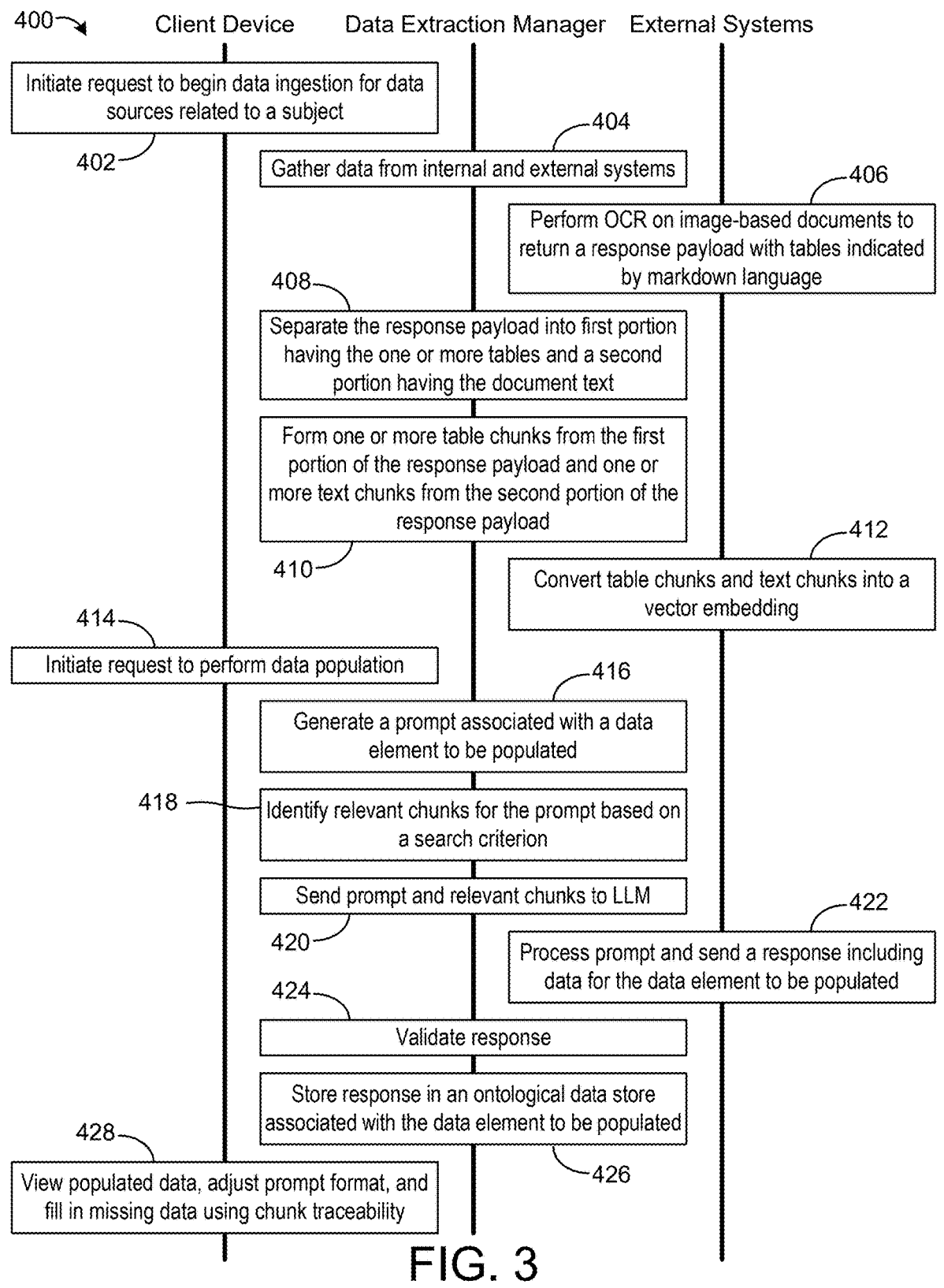
FIG. 3 is swim lane diagram illustrating steps within a method for data extraction and population including the components that perform the steps, according to some embodiments.

FIG. 3 shows a swimlane diagram 400 illustrating certain operations within a method for data extraction and population and indicating the components or systems that perform the steps, according to some embodiments. The first swimlane is labeled "client device" and may refer steps that are performed by a user of the data extraction and population system 100, for example, using the one or more UI clients 102. The second swimlane is labeled "data extraction manager" and may refer to steps that are performed by the data extraction manager system 200. The third swimlane is labeled 'external systems" and may represent steps that are performed by the OCR system 106, the LM, or the text embedder 112. In general, the flow of the swimlane diagram 400 is from top to bottom. However, some steps can be performed in different orders and/or in parallel.

The client device may initiate request to begin data ingestion for data sources related to a subject (e.g., topic, company, person, place, etc.) in step 402. A user may, from the one or more UI clients 102, select a task, one or more data elements to be populated, and/or a subject about which to populate the data. The user interface may activate one of the APIs 286 of the interface manager 280, causing the data extraction manager system 200 to begin processing the request. The data extraction manager system 200 may gather data from internal and external systems (e.g., the one or more data sources 104) in a step 404. For example, data may be gathered using the data scraper 224 as described herein. The external systems (e.g., in this case the OCR system 106) may perform OCR on image-based documents to return a response payload with tables indicated by markdown language in operation 406. For example, some of the gathered documents may be image-based (e.g., a PDF) that require conversion to plain text, while other documents may be already text based (e.g., from a website, etc.). The OCR system 106 ensures that text and tables are in a machine-readable format prior to further processing.

The data extraction manager system 200 may separate the response payload into a first portion having the one or more tables and a second portion having the document text in the step 408. In some embodiments, the step 408 is performed by the markup decoder 244. The markdown provided by the OCR system 106 may use symbols to represent a tabular structure (e.g., the vertical bar or pipe character, '|' may indicate the start of a table row and a new column within that row). The markup decoder 244 may search for certain patterns in the plain text (e.g., with markdown symbols) to determine where a table begins. In some embodiments, a text-based search or regular expressions can be used with wildcards in order to identify a table in plain text. For example, regular expression '\|.*?\|\n\n' may be used to find text (e.g., data, etc.) that is part of a table. After finding a row from a table, the portion of the table may be moved into another entry of the data store (e.g., the internal data storage 226). After this process, the plain text (e.g., the first portion of the response payload) may have the tabular information removed, and the second portion of the response payload may have only the tabular information.

One or more table chunks from the first portion of the response payload and one or more text chunks from the second portion of the response payload are formed in step 410. For example, the table chunker 246 and the text chunker 248 may be used to generate table chunks and/or text chunks as described herein. Step 410 may include generating the table chunks that include the whole table, or a number of rows or columns of the table. Text chunks may include a number of characters, words, or tokens (e.g., 2000 characters, 500 words, 1000 tokens, etc.). In some embodiments, the token length is optimized based on a trade-off between the amount of information that is communicated to the LLM 108 (e.g., related to the cost, number of computations, or energy usage) and the accuracy of the result.

In some embodiments, the table chunks and text chunks are converted into a vector embedding in step 412. For example, the data extraction manager system 200 may use the text embedder 112 to generate a vector embedding of the table chunks and/or text chunks. Embedding the chunks may convert the text into a vector or array of numbers that represent the semantic meaning of the text. The table chunks and the text chunks may be converted into vector embeddings and stored in the index for semantic search during retrieval augmentation. Alternatively, only the text chunks are converted into vector embeddings, and the table chunks may be searched by text-based keyword search of the header column and/or the first row. After step 412 is performed, the ingestion process (e.g., the gathering and preparation of documents for the RAG system of the data extraction and population system 100) may be complete and the data extraction and population system 100 ready to respond to requests for data population.

In step 414 of the swimlane diagram 400, the user, by way of the one or more UI clients 102, may initiate request to perform data population. For example, the user may choose one or more data elements to populate, develop an ontology or data model, or otherwise indicate what data is to be extracted from the documents prepared in the ingestion process before initiating the request. In some embodiments, the request to begin data ingestion of step 402 and the request to perform data population of step 414 are included together, and the other components of the data extraction and population system 100 perform all steps to extract the data without user interaction.

The steps 416-426 of the swimlane diagram 400 describe how one or more data elements are extracted using a single prompt. In some embodiments, the steps 416-426 are repeated for a number of prompts to extract a number of data elements requested by the user. The steps 416-426 may be performed sequentially, in parallel, or in a combination of both sequential processing and parallel processing.

In step 416 a prompt associated with a data element to be populated may be generated. Prompt generation may be performed by the prompt manager 262 and may include selecting an appropriate template prompt for the data element from the internal data storage 226. The swimlane diagram 400 may continue with identifying relevant chunks for the prompt based on a search criterion in step 418. For example, the semantic searcher 264 and the keyword searcher 266 may generate scores indicative of the relevance for the various chunks indexed in step 412. Separating the tabular information from the text information, among other advantages, allows the table chunks and text chunks to be searched differently. For example, certain prompts may only search for table chunks by keyword, while other prompts may search based on a weighted score of both a semantic search process and a keyword search process. Step 418 may include identifying all chunks for which the generated score is exceeds a threshold (e.g., less than a threshold for a distance metric or greater than a threshold for a similarity score) or choosing a number of the highest scoring chunks. The identified chunks or portions of documents associated with the chunks may be augmented with the prompt in step 420 and sent (e.g., communicated), to the LM (e.g., of the one or more LLMs 108 and/or the one or more MMLMs).

In some embodiments, step 422 includes processing the prompt and communicating a response including data for the data element to be populated. For example, the LM may send the response to the data extraction manager system 200. The response may be validated in step 424. Accuracy of the responses obtained from the LM may be checked by the response validator 270. Each prompt template may store information about the expected response (e.g., type, length, acceptable range if numeric, etc.) which may used to determine if the response is appropriate for the type of data requested by the response. For example, in step 424, if a result is expected to be numeric, it is possible to check the semantic meaning of the response and determine if it is a number. Errors, for example, no response and/or data flagged in step 426 may be subjected to additional processing. For example, the identifier of the chunks identified in step 418 or the document and page of the source information for the chunk may be stored with the prompt so the user can trace the reason for the response and validate the data or note the reason for the error and populate the data manually.

After validation in step 424, the data of the response may be stored in an data store associated with the data element to be populated. For example, the data may be stored as a key value pair where the data element is the key, and the value is the response from the LM generated in step 422. Stored data may be delivered to a user interface and may be viewed by the user in step 428. In the event of an error, the user may adjust prompt format, and/or fill in missing data using chunk traceability in step 428.

FIGS. 4-7 show various flows of operations representing various aspects of the present disclosure. Each of the flows of operation may illustrate all or a portion of the process of extracting data using a large language model with retrieval augmentation, according to some embodiments. FIGS. 4-6 may emphasize various aspects of some embodiments and therefore some steps (e.g., operations) may be omitted from the flow of operations, the flow of operations may start after some steps have been completed, may end assuming some operations are performed after completing the flow of operations. In particular, FIG. 4 is related to improvements to both data extraction using a large language model and document retrieval by appropriate processing of both tabular and textual data within a RAG framework; FIGS. 5A-C are related to improvements to accuracy by allowing parameters of the retrieval process to be associated with a particular prompt (e.g., query parameters are associated with a prompt or request to extract particular information, a data element, etc.); and FIG. 6 is related to providing traceability to source documentation within the RAG framework, allowing a user to see exactly where information is sourced.

FIG. 4 shows a flow of operations 500 for coordinating data extraction and population, according to some embodiments. The flow of operations, for example, may be performed by the data extraction manager system 200 of the data extraction and population system 100. The flow of operations 500 may include receiving a response payload that includes document text of the document and one or more tables of the document represented using markdown language in operation 502. The response payload may be generated from an optical character recognition tool (e.g., the OCR system 106). The data extraction manager system 200 may receive from the OCR system 106 a response payload with tables inline with the text using a markdown language. For example, the first appearance of the markdown symbol indicates the start (or top) of a table and a second appearance of the same markdown symbol indicates the end (or bottom) of the table. The markdown symbols may also indicate a first (e.g., left) side of the table and a second (e.g., right) side of the table. Markdown symbols (e.g., within text) may provide characteristics of the table. The markdown system may provide information to the system, so the system may render the table. For example, the vertical bar or pipe character, 'I', may be used to mark the start of a new column within a row of the table, and the vertical bar followed by a newline character (e.g., '/n') may be used to represent a new row. The markdown language may also use hyphen characters, '-', to separate a header row from a content row within a table. When analyzing the position of each cell, the system may consider each cell as having a single row of text, regardless of the number of lines of text in each cell. Additionally or alternatively, the response payload from the OCR system 106 may use JSON to indicate the location of the tabular data. A component of the data extraction manager system 200, for example, the OCR manager 242, may convert JSON into a format in which the tables are represented by markdown symbols, which can be received by the processors for further processing during later operations of the flow of operations 500.

The flow of operations 500 may include separating, using the markdown language, the response payload into a first portion having the one or more tables and a second portion having the document text in operation 504. The operation 504 may be performed by the markup decoder 244. During operation 504 certain patterns in the plain text may be found (e.g., with markdown symbols) to determine where a table begins. For example, the regular expression '\|.*?\|\n\n' may be used to find text (e.g., data, etc.) that is in a row of a table. After finding a row from a table, the markup decoder 244 may generate a new entry (e.g., a location to store the first portion of the response payload having the tabular data) in the internal data storage 226 (e.g., a table entry) to store the rows of the table. The rows of the table may be cut from the plain text and moved to the table entry until the next text that does not satisfy the regular expression. After this process, the plain text (e.g., the second portion) may have the tabular information removed (e.g., and be ready to be broken into text chunks) and the table entry or first portion may have the tabular information.

The flow of operations 500 may include forming, by the one or more processors using a chunking methodology, one or more table chunks from the first portion of the response payload and one or more text chunks from the second portion of the response payload in operation 506. The operation 506 may be performed by the table chunker 246 and text chunker 248 as described with reference to those components of the data extraction manager system 200. For example, the table chunks may include a fixed or adaptive number of rows, the entire table, etc. and the text chunks may include a fixed or adaptive number of characters, words, etc.

The flow of operations 500 may include generating, by the one or more processors, an index for the one or more table chunks and the one or more text chunks in operation 508. Generating the index may include converting the one or more table chunks and the one or more text chunks into vector text embeddings using a text embedding model. For example, the operation 508 may be performed by the indexer 252. The indexer 252 may coordinate with the text embedder 112 to generate a vector embedding for a text chunk. Vectorization gives the text chunk numerical values that can be searched, with computational efficiency, for similarity (e.g., using a distance metric); thereby, text chunks with similar semantic content to a prompt can be identified for retrieval. By generating vector embeddings of the text chunks and/or the table chunks, an index may be created for which chunks can be searched (e.g., queried for retrieval) based on their similarity to a prompt for data extraction.

In some embodiments, the flow of operations 500 includes associating a document identifier and a page identifier associated with table chunks and text chunks. The chunk identifier, document identifier, and/or page identifier may be stored with the chunk. Advantageously, the retrieved chunks or portions of the documents (e.g., the sources used by the LM during prompt processing) may be cited for regulatory reasons, in the scenario of an erroneous response, or a response that the user of the system finds questionable.

The flow of operations 500 may include identifying a relevant table chunk of the one or more table chunks or a relevant text chunk of the one or more text chunks based on a search criterion related to a prompt for a large language model in operation 512. Identifying a relevant table chunk or a relevant text chunk may include performing a semantic search (e.g., using a distance metric to compare an embedding of the prompt to an embedding of the chunk in the index), a keyword search (e.g., by counting a number of keyword or phrase matches), or a combination of both a semantic search and a keyword search. For example, the operation 512 may be performed by the generative AI manager 260 using the semantic searcher 264 and/or the keyword searcher 266 as described herein.

The flow of operations 500 may include sending (e.g., communicating, transmitting, etc.) the prompt and the relevant table chunk or the relevant text chunk to a large language model in operation 514. For example, the operation 514 may be performed by the LM manager 268. The prompt may include a request for extracting a data element from the documents (e.g., that have been converted to text chunks and table chunks). The LM (e.g., of the one or more LLMs 108 and/or the one or more MMLMs) may generate a response to the prompt that includes the data element. The flow of operations 500 may include storing a response from the large language model to the prompt and the relevant table chunk or the relevant text chunk in the data store in operation 516. For example, the data element may be populated in the data store with the information from the response. In some embodiments, a request for the LMs (e.g., of the one or more LLMs 108 and/or the one or more MMLMs to identify the chunks used during data extraction is also provided with (e.g., as part of) the prompt. The LM may return the identifiers of the used chunks. The used chunks and/or the text or tables thereof may be displayed or reported with the extracted information. Providing the user access to the information used by the LM may allow inaccuracies and/or hallucinations by the LLM to be detected, traced, and analyzed for root cause.

FIGS. 5A-C are related to improvements to accuracy by allowing parameters of the retrieval process to be associated with a particular prompt (e.g., query parameters associated with a prompt or request to extract particular information, a data element, etc.). FIG. 5A shows a flow of operations 520 for retrieval augmentation according to retrieval parameters associated with a prompt (e.g., a request to extract particular information from one or more source documents or a request to populate particular information within a data store). The flow of operations 520 may include acquiring, by the one or more processors, an extraction prompt configured to cause a large language model to extract requested data from retrieved chunks of the one or more chunks in operation 522. The prompts and/or prompt templates may include various additional data associated with the prompt. For example, an expected data type for the extracted information may be associated with the prompt. Additionally or alternatively, one or more retrieval parameters may be associated with the prompt. In some embodiments, the retrieval parameters are used to specify specific filters, techniques, etc. for searching a RAG index. Each prompt (e.g., request to extract different information) may retrieve relevant chunks in a specific (e.g., unique, tailored, custom) manner by way of different retrieval or search parameters. For example, the operation 522 may be performed by obtaining the current prompt from the internal data storage 226 by the prompt manager 262.

The flow of operations 520 may include identifying, by the one or more processors, one or more relevant chunks according to retrieval parameters associated with the extraction prompt, the one or more relevant chunks identified from an index of one or more chunks from one or more documents, the index including vector text embeddings of the one or more chunks in operation 524. The operation 524 may be performed by the generative AI manager 260 using the semantic searcher 264 and or the keyword searcher 266. Different retrieval parameters may be used to tailor the identification of chunks for extraction of particular information. For example, a chunk type designation, a document type designation, a search type designation, regular expressions, a weighted hybrid search, and/or a search reach criterion may be used independently or in combination to customize a search. In some embodiments, more than one set of retrieval parameters is provided in a hierarchy. Subsequent sets of retrieval parameters may broaden the search criteria and be used if the relevant chunks found using the first set of retrieval parameters does not satisfy a retrieval criterion (e.g., number of chunks identified, etc.).

A chunk type designation may be used to specify if the relevant chunks (e.g., retrieved chunks or chunks provided to the LLM) are to be retrieved from table chunks, text chunks, or any other type of chunk that is referenced in the index, or a combination thereof. A document type designation may be used to specify the type of document from which the relevant chunks should originate. For example, each chunk may have an associated source document type property stored with the index. During the search (e.g., as part of the query), chunks may be filtered based on the document type. A search type designation may be used to specify if the search is to be performed using a semantic search (e.g., comparing the vector embeddings of the chunks), a keyword search, or a combination of the two search types. In some embodiments, if both semantic search and keyword search are to be used together the retrieval parameters may include weighting parameters describing how to combine the results of the keyword search and the semantic search so that an overall relevance score can be used to rank the chunks and/or compare to a threshold to determine the relevant chunks.

After one or more relevant chunks are identified, those relevant chunks may be provided to the LMs (e.g., of the one or more LLMs 108 and/or the one or more MMLMs) with the prompt. In some embodiments, a search reach criterion is also be used to provide additional chunks related to the one or more relevant chunks. The search reach parameter defines a number of chunks related (e.g., adjacent, nearby) to the one or more relevant chunks. For example, for each identified relevant chunk, the generative AI manager 260 may include all the chunks that are from the same page as the identified relevant chunk or all the chunks that satisfy the search reach criterion with the identified relevant chunk. Advantageously, in such a system the chunks generated and stored in the index can be smaller, for example, to have a concise semantic meaning for improved retrieval, and the LM is provided with contextual information adjacent to the relevant chunk to help with information extraction.

The flow of operations 520 may include sending, by the one or more processors, the prompt and the one or more relevant chunks to a large language model in operation 526. For example, the operation 526 may be performed by the LM manager 268. Advantageously, the high degree of specificity provided by the retrieval parameters (e.g., while executing a query) will reduce the number of computations necessary to complete the search and retrieve the relevant documents for the LM, provide information to the LM with increased relevance, and may reduce the amount of data that is sent over the network to the LM. The flow of operations 520 may include storing a response from the large language model to the extraction prompt and the one or more relevant chunks in operation 528. For example, data may be stored in internal data storage 226 allowing a user of the data extraction manager system 200 access to the extracted information (e.g., data elements, properties of an ontology, etc.) for viewing, report generation, etc.

FIG. 5B shows detailed operations included in some embodiments of the operation 524. For example, more than one set of retrieval parameters may be associated with a prompt or data to extract. A hierarchical list of retrieval parameters may be used to iteratively broaden the search until the relevant chunks satisfy a retrieval criterion (e.g., identified more than a threshold number of chunks, etc.). The operation 524 may include identifying, by the one or more processors, the one or more relevant chunks according to a first set of retrieval parameters in operation 530.

In some embodiments, the operation 524 includes determining, by the one or more processors, whether the one or more relevant chunks satisfy a retrieval criterion in operation 532. If the data scraper 224 was not able to find many documents from the one or more data sources 104 a small number of chunks or no chunks may be identified in operation 530. If no chunks are provided to the LM the LM may be unable to extract the requested information. The retrieval criterion may be based on a number of chunks determined to provide consistently accurate responses from the LM. If the retrieval criterion is satisfied at block 534, the flow may continue to sending the one or more relevant chunks to the large language model (e.g., in operation 526 of the flow of operations 520). If the retrieval criterion is not satisfied at block 534, a second set of retrieval parameters may be used, potentially to identify more relevant chunks and satisfy the retrieval criterion in operation 536. The operations 532-536 may continue with broadening retrieval parameters until the retrieval criterion is satisfied. During the second and subsequent identification steps, it is contemplated that the search may be performed relative to the previous search for computational efficiency. For example, if the second search adds table chunks to a search that previously included only text chunks, it is not necessary to search the text chunks again with the same retrieval parameters.

FIG. 5C shows a flow diagram for the operation 524 in more detail, according to some embodiments. In some embodiments, the retrieval parameters may include a chunk type designation. The chunk type designation may be used to cause filtering, by the one or more processors, of one or more table chunks having tabular data from one or more text chunks having text data according to a chunk type designation in an operation 538. The chunk type designation may indicate that one or more relevant chunks are to be retrieved from the one or more table chunks, the one or more text chunks, or both the one or more table chunks and the one or more text chunks. Operation 538 may reduce the number of candidate chunks that are provided to the LM (e.g., if the chunk type designation specifies only table chunks or only text chunks). In some embodiments, the retrieval parameters may include a document type designation. The document type designation may be used to cause filtering of one or more chunks according to a document type designation in an operation 540. The document type designation may indicate one or more document types from which the chunks are to originate, thereby reducing the number of candidate chunks that may be provided to the LM (e.g., if the document type designation does not indicate all document types).

In operation 542, the remaining candidate chunks may be searched according to a search type designation indicating the one or more relevant chunks are to be searched using a semantic search, a keyword search, or both the semantic search and the keyword search. Performing a semantic search may include generating, by the one or more processors, distance metrics between the vector text embeddings and a vector text embedding of the extraction prompt in operation 544, and performing a keyword search may include generating, by the one or more processors, keyword scores between the one or more chunks and a keyword associated with the extraction prompt in operation 546. For example, a keyword score may be equal to a number of keyword matches or a function thereof. Additionally or alternatively, regular expressions can be used during a keyword search. In some embodiments, weighting parameters are provided as part of the retrieval parameters. The weighting parameters may be used to define a weighted function of the keyword scores and the distance metrics of the candidate chunks by which to rank or select the relevant chunks. For example, the operation 524 may include comparing, by the one or more processors, a weighted function of the keyword scores and the distance metrics of the one or more chunks according to weighting parameters in an operation 548.

In some embodiments, a search reach criterion is also be used to provide additional chunks related to the one or more relevant chunks as shown in operation 550. The operation 524 may include identifying, by the one or more processors, one or more reached chunks that satisfy a search reach criterion with a relevant chunk. The search reach criterion may define a number of chunks related (e.g., adjacent, nearby) to the one or more relevant chunks that are to be provided to the LM. For example, for each identified relevant chunk, the generative AI manager 260 may include all the chunks that are from the same page as the identified relevant chunk or all the chunks that satisfy the search reach criterion with the identified relevant chunk. Advantageously, in such a system the chunks generated and stored in the index can be smaller, for example, to have a concise semantic meaning for improved retrieval, and the LM is provided with contextual information adjacent to the relevant chunk to help with information extraction.

FIG. 6 shows a flow of operations 560 related to providing traceability to source documentation within the RAG framework, according to some embodiments. The flow of operations 560 may include generating, by one or more processors, a plurality of chunks from a document in operation 562. The plurality of chunks may include table chunks, text chunks, or any other type of chunk suitable for a data extraction process. For example, the plurality of chunks may be generated by the table chunker 246 and the text chunker 248.

In some embodiments, the flow of operations 560 includes associating, by the one or more processors, (i) a document identifier for the document and a page identifier or (ii) a chunk identifier for each chunk of the plurality of chunks in operation 564. The document identifier and page identifier or the chunk identifier allow source content of the chunk to be retrieved under certain scenarios (e.g., responsive to an error, during report generation, etc.). The document identifier and page identifier or the chunk identifier may be associated with a chunk by storing the information in a database with the chunk. For example, the data model for a chunk may include properties for storing the document identifier, page identifier, and/or chunk identifier. The operation 564 may be performed by the chunk tracer 250 during the data ingestion process.

Source documents (e.g., from the one or more data sources 104) may update or change over time. Therefore, it may be advantageous to periodically obtain documents for a specific task (e.g., data population job, etc.). However, if the documents change after some data has been extracted, traceability may be lost. In some embodiments, the flow of operations 560 includes maintaining, by the one or more processors, a usage history and/or a version history for each chunk of the plurality of chunks in operation 566. For example, each time a document changes, new chunks may be created, and the new chunks may store each revision of their respective information or new chunks may be created. Using the revision history and usage history, it may be possible to provide the date and the content of a document that was used to extract the information, or if new chunks are generated when a document changes, the old chunks may be stored (e.g., for traceability), but decommissioned (e.g., no longer searched for retrieval purposes). In addition, the usage history of chunks or the number of times a chunk has been used (e.g., usage counts) may be displayed on a UI to determine which of the one or more data sources 104 are often used for information extraction. For example, the usage history may allow one to optimize the one or more data sources 104, potentially eliminating subscriptions to less useful of the one or more data sources 104. The chunk tracer 250 may perform the operation 566.

In some embodiments, the flow of operations 560 includes identifying, by the one or more processors, one or more relevant chunks from the plurality of chunks based on a search criterion related to a prompt for a large language model, wherein the prompt includes a request to extract particular information using the one or more relevant chunks in operation 568 (e.g., as performed by the semantic searcher 264 and/or the keyword searcher 266). The one or more relevant chunks may be combined with a prompt for the LM to extract particular information from the chunks (and therefore from the source documents). The flow of operations 560 may include recording, by the one or more processors, a timestamp for each chunk used by the large language model in operation 570. As the one or more chunks are identified for retrieval a timestamp may be associated with the chunk (e.g., stored with the chunk) indicating when the relevant chunk was chosen for retrieval. In some embodiments, the timestamps allow traceability by comparing the timestamp a chunk was used to the version history of the chunk.

The flow of operations 560 may include transmitting a prompt to the large language model in operation 572. The prompt may include a request to extract particular information using the one or more relevant chunks and the prompt may also include the one or more relevant chunks. In some embodiments, the prompt may also include request for the large language model to identify used chunks of the one or more relevant chunks used to extract the particular information. To provide traceability each chunk may be given a unique identifier (e.g., a chunk identifier, a document and page identifier, etc.) and the LM can include its response the identifier of the chunks used during processing. The identifiers provided to the LM may be globally unique or may be unique only to the current prompt (e.g., if 23 chunks are provided to the LM, the integers 1-23 may be used as unique identifiers related to the scope of that prompt). In some embodiments, the prompt may also include a request for the LM to report any errors encountered by the LM.

The flow of operations 560 may include storing the particular information from a response to the prompt from a large language model with (i) the document identifiers associated with the one or more used chunks and the page identifiers associated with the one or more used chunks or (ii) the chunk identifiers for the one or more used chunks in operation 574. The document identifiers, page identifiers, and/or chunk identifiers may be used to provide an association between the extracted, particular information and the source documentation. The association may be used to provide traceability between the data elements populated with the particular information and the source documentation, allowing for error correction and citation generation in user interfaces and or generated reports.

The flow of operations 560 may include generating, by the one or more processors, a user interface including the particular information and/or a citation to the document generated from (i) the document identifiers associated with the one or more used chunks and the page identifiers associated with the one or more used chunks or (ii) the chunk identifiers for the one or more used chunks in operation 576. For example, the interface manager 280 may create the interface to allow a user to view the extracted information with the source information (e.g., to allow for human-in-the-loop validation). The flow of operations 560 may also include generating, by the one or more processors, a citation list based on the document identifiers and page identifiers associated with the one or more used chunks in operation 578. A citation list may be used at the end of a report, presentation, or other such document that may require information sources to be cited. The citation list may also include each extracted, particular information with the citation to the source information (e.g., for regulatory purposes). Providing the user access to the information used by the LLM 108 may allow inaccuracies and/or hallucinations by the LLM to be detected, traced, and analyzed for root cause.

Figure 7:
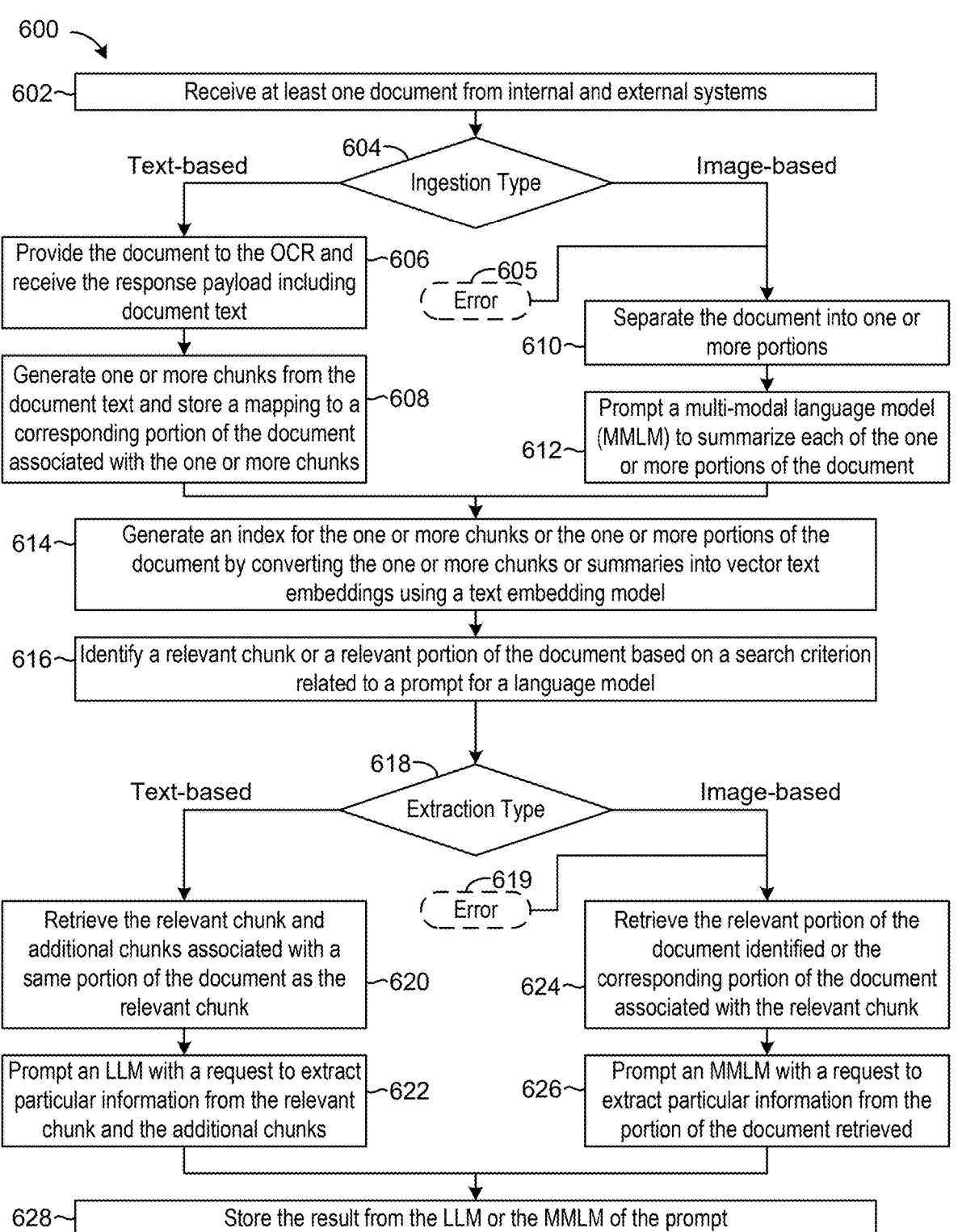
FIG. 7 is a flow of operations for extracting information using a hybrid retrieval augmented generation system with a large language model and multi-modal language model.

FIG. 7 shows a flow of operations 600 for coordinating data extraction and population using LMs (e.g., the one or more LLMs 108 and/or the one or more MMLMs 110) according to some embodiments. The flow of operations 600 shows a text-based side (e.g. on the left) and an image-based side (e.g., on the right). The path (e.g., text-based or image-based) used to traverse the flow of operations 600 may be independently chosen for ingestion and/or extraction. The path may also be independently chosen for each document, each page, each file, each task (e.g., group of data to extract), or any other appropriate level of granularity. The flow of operations 600 may be performed by the data extraction manager system 200.

The flow of operations 600 may provide several advantages. Some documents may be difficult for a text-based LLM (e.g., the one or more LLMs 108) to extract information from. Several examples of such documents are described herein. One such type of document, for example, includes selections of multiple-choice questions that are responded to by hand (e.g., with pen or pencil). The visual information included in such documents (e.g., a selection of a response, a layout, etc.) may be properly identified and used by an MMLM (e.g., of the one or more MMLMs 110) to aid in the extraction process. The image-based path using the MMLM may greatly improve extraction accuracy for some documents. The image-based path, however, may use significantly more computations than the text-based path, due in part to the larger number of parameters and general additional complexity associated with the MMLM. In addition, using the MMLM may increase network traffic by communicating larger image-based files. Advantageously, the flow of operations 600 provides the capability for the path chosen to be based on the type of document, the processing request, etc. allowing for the executing system to use the more costly (e.g., computationally) image-based path when necessary or when the benefit of the additional accuracy outweighs the added cost. Additionally or alternatively, if text-based extraction fails (e.g., the response validator 270 determines the response was missing, incorrect, etc.) the flow of operations 600 may proceed to executing the image-based extraction as a backup method.

Advantages are also provided during the ingestion phase. An index may be generated for chunks (e.g., portions of the document) using a text-based approach and/or using an image-based approach. Surprisingly, indexes created using the text-based approach may provide similar accuracy to indexes created using the image-based approach for many scenarios. Thus, by using the text-based path for document ingestion (e.g., indexing), computational expense may be significantly reduced while providing similar accuracy. During ingestion, the flow of operations 600 also provides the ability for certain documents to be ingested using the image-based approach (e.g., for certain document types and/or responsive to a failure or error in the text-based path).

The flow of operations 600 may also provide advantages to a system that is upgraded from a text-based only approach. By executing the flow of operations 600, a system for which many documents have already been ingested may obtain the advantages of using one or more MMLMs 110 without generating a new retrieval index. Instead, documents may be retrieved using text-based chunks, but an image associated with the text-based chunks may be provided to the one or more MMLMs 110. In some scenarios, data ingestion may have a very long processing time and re-embedding data (generating a new index) may have a high cost and/or be time consuming, especially if performed using the one or more MMLMs 110 in the image-based ingestion path.

The flow of operations 600 may include receiving at least one document from internal and/or external systems in operation 602. For example, the data manager 220 may receive (e.g., obtain, acquire, get, etc.) a document from the one or more data sources 104. The document may be of any of the types described herein. For example, the document may be a file, record, report, article, form, data, application, questionnaire, etc.). The document may include text, tables, columns, rows, charts, graphics, images, and/or other content. The document may be image-based, include text encoded for computer readability (e.g., plain text), and/or a combination of image-based and plain text.

In some embodiments, the flow of operations 600 includes a decision 604 to determine if the desired ingestion type is text-based or image-based. For example, the ingestion manager 240 may determine the desired ingestion type. The desired ingestion type may be based on various criteria. In some embodiments, the ingestion type is based on the document type (e.g., image-based or text-based, file type, purpose of the document, etc.). Additionally or alternatively, the ingestion type may be based on the one or more data sources 104 from which the document was obtained. For documents indicating text-based ingestion, the flow of operations 600 may proceed to operations 606 and 608. For documents indicating image-based ingestion, the flow of operations 600 may proceed to operations 610 and 612.

The flow of operations 600 may include providing the document to the OCR and receiving the response payload including document text in the operation 606. For example, the OCR manager 242 may communicate the document to the OCR system 106 and receive the response payload from the OCR system 106. In some embodiments, the response payload may include document text and table text (e.g., using a markup language as described herein). Other indications and/or markups may be provided by the OCR system 106. For example, the payload may include an indication of handwritten characters and/or typeset. Additionally or alternatively, the payload may include an indication of the text layout and/or where figures occur within the text.

Text-based ingestion in the flow of operations 600 may include generating one or more chunks from the document text and storing a mapping to a corresponding portion of the document associated with the one or more chunks in operation 608. Chunks may refer to segments of the document text that was returned from the OCR system 106. Chunks may also include tabular data, for example, using a markup language. In some embodiments, the tabular data is separated from the document text. For example, each table may be stored in a corresponding single chunk or a number of chunks. The operation 608 may include dividing the document text into chunks of a fixed length (e.g., 500 characters, 100 words, 4 sentences, etc.). In some embodiments, the fixed length may vary by an amount to complete a portion of the text of a coarser granularity. For example, if the fixed length 500 characters for a chunk, the operation 608 may choose a larger number of characters to complete the word with the 500th character or choose a smaller number of characters, thus not including the word that would have the 500th character. The decision may be fixed (e.g., the operation 608 may always choose a smaller number of characters) or the decision may be based on the particular situation for the current chunk being processed (e.g., it may choose the smaller or larger number of characters based on which would cause the resulting chunk to be closest to a 500 character target).

The operation 608 may also include storing a mapping between a corresponding portion of the document for the one or more chunks. For example, a document identifier and/or a page identifier may be associated with each chunk. The mapping may map a chunk to a specific portion of the document that included the chunk. The portion of the document may, for example, be a page, a section, a paragraph, a line, or any other appropriate division of the document that may be retrieved based on a chunk in other operations of the flow of operations 600. In some embodiments, the operation 608 stores a mapping between a chunk and a page of the document that included the chunk. During retrieval, the mapping may be used to retrieve the page having a relevant chunk, for example, to provide to an MMLM (e.g., of the one or more MMLMs 110).

Text-based document ingestion has previously been described with the flows of operations 500 (e.g., operations 502-510) in FIG. 4 and the swimlane diagram 400 in steps (402-410) in FIG. 3. Such operations and/or other similar operations described herein (e.g., those performed by the ingestion manager 240) may replace similar operations within the flow of operations 600.

At any operation of the text-based data ingestion path (e.g., the operations 606 and 608) any error may occur (represented by error block 605). If it is determined that the error may be avoided by performing image-based processing, the flow of operations may switch paths to the image-based document ingestion including operations 610 and 612. The error represented by the error block 605 may occur in other operations of the flow of operations 600. For example, if indexing fails and the document has not undergone image-based processing, the flow of operations 600 may continue to the operation 610. Embedding failures may be detected by the text embedder 112. The indexer 252 and/or another component of the data extraction manager system 200 may request the text embedder 112 to output a comprehension score (e.g., a coherence score, etc.) to indicate whether the output of the OCR had a coherent and understandable semantic meaning. For example, a low coherence score may indicate the text from different sections of the document, from figures, etc. was included in a chunk and image-based ingestion may provide an improvement. In some embodiments, error detection is performed by the component of the data extraction manager system 200 that is executing the current operation. For example, error detection within operations 606, 608, and 614, may be performed by a corresponding instruction set of the ingestion manager 240.

For documents indicating image-based ingestion, the flow of operations 600 may proceed to operations 610 and 612. Image-based ingestion may include separating the document into one or more portions in the operation 610. A portion may refer to a page, a section, an area, and/or any portion of a document that can be individually provided to the one or more MMLMs 110. The flow of operations 600 may include prompting a multi-modal language model (MMLM) to summarize each of the one or more portions of the document during the operation 612. For example, the generative AI manager 260 may communicate a request for summarization and a portion of the document to the one or more MMLMs 110 sequentially until each of the portions have been summarized. In some embodiments, the portion of the document is converted to an file type accepted by the one or more MMLMs 110 (e.g., an image-based file type such as a PNG)

prior to being sent for summarization. In some embodiments, the summaries received from the MMLM are stored as chunks so that downstream processing of the flow of operations 600 can be performed by the same process (e.g., using the same instructions, etc.) regardless of whether a document or portion thereof was processed using the image-based path or the text-based path.

In some embodiments, the one or more MMLMs 110 are not used to perform data ingestion. Using the one or more MMLMs 110 may cause additional computations to be performed, for example, because of the larger network structure. The text-based path may be used for document ingestion in such embodiments.

The flow of operations 600 may include generating an index for the one or more chunks or the one or more portions of the document by converting the one or more chunks or summaries into vector text embeddings using a text embedding model in the operation 614. Index generation may be performed by the indexer 252. The operation 614 may include generating for each chunk a vector embedding for the text of the chunk. The vector embedding may represent the semantic meaning of the chunk. For example, the vector embedding may be generated by averaging a vector embedding for each word of the chunk. In some embodiments, context and word order may be considered when generating the vector embedding for a chunk. For example, the operation 614 may execute a network model using a transformer-based architecture to generate the embedding. Generating an index has previously been described with reference to the operation 508. The operation 508 and other similar operations described herein (e.g., those performed by the ingestion manager 240 including the indexer 252) may replace similar operations within the flow of operations 600.

The operations 602-614 of the flow of operations 600 may describe document ingestion. After documents have been ingested, the extraction portion of the flow of operations 600 may be used to extract data from the documents (e.g., that may have been converted to chunks during the ingestion process). Extraction may begin with retrieving relevant chunks and/or portions of the documents. Extraction may also be performed with either of two paths (e.g., a text-based path and an image-based path).

The flow of operations 600 may include identifying a relevant chunk or a relevant portion of the document based on a search criterion related to a prompt for a language model. In some embodiments, a prompt that is to be sent to an LM (e.g., the one or more LLMs 108 and/or the one or more MMLMs 110) is converted into a vector embedding. For example, the same embedding model used to generate the index during the operation 614 may be used during the operation 616. After the prompt has been embedded, the vector embedding of the prompt may be compared to the vector embeddings of the index (e.g., for the chunks and/or the portions of the document that were ingested). The chunks and/or portions of the document having embeddings that satisfy a matching criterion with the prompt embedding or those that have the highest matching score (e.g., the lowest distance metric) to the prompt embedding may be identified as relevant and used in later processing. Additionally or alternatively, the keywords (e.g., from the prompt, etc.) may be used to identify relevant chunks and/or portions of the document. For example, keyword and/or regular expression searches may be performed on the chunks and/or the summaries of the portions of the document. Those chunks (and/or summaries) having the highest keyword frequency or having a keyword frequency above a threshold may be identified as relevant in operation 616. Identifying relevant chunks has previously been described with reference to operations 512 of FIG. 4, the operation 524 of FIGS. 5A-C, and operation 568 in FIG. 6. Such operations and other similar operations described herein (e.g., those performed by the semantic searcher 264 and/or the keyword searcher 266) may replace similar operations within the flow of operations 600.

In some embodiments, the flow of operations 600 includes a decision 618 to determine if the desired extraction type is text-based or image-based. For example, the generative AI manager 260 may determine the operational path to perform data extraction. The desired extraction type may be based on various criteria. In some embodiments, the extraction type is based on the document type (e.g., image-based or text-based, file type, purpose of the document, etc.). Additionally or alternatively, the extraction type may be based on the one or more data sources 104 from which the document was obtained. In some embodiments, the extraction type is based on the chunk that is identified as relevant in the operation 616. For example, the ingestion manager 240 may label each chunk during document ingestion to indicate whether the chunk should be processed using the text-based path or the image-based path. For chunks or portions of the document indicating text-based extraction, the flow of operations 600 may proceed to operations 620 and 622. For documents indicating image-based ingestion, the flow of operations 600 may proceed to operations 624 and 626.

Text-based extraction in the flow of operations 600 may include retrieving (e.g., getting, obtaining, etc.) the relevant chunk (e.g., identified for retrieval in the operation 616) in the operation 620. In some embodiments, additional chunks associated with a same portion of the document as the relevant chunk are also retrieved in the operation 620. The additional chunks may be identified and/or retrieved using the mapping from the operation 608. For example, the generative AI manager 260 and/or the prompt manager 262 may perform the operation 620. In some embodiments, chunk identification and retrieval is performed in one step, for example, if the vector embedding is stored with the chunk.

Text-based extraction may also include prompting an LLM (e.g., the one or more LLMs 108) with a request to extract particular information from the relevant chunk and the additional chunks in the operation 622. Similar operations and have previously been described herein (e.g., those performed by the prompt manager 262 and/or the LM manager 268 and in the operations 514 or 526) and may replace the operation 622 within the flow of operations 600.

At any operation of the text-based data extraction path (e.g., the operations 620 and 622) any error may occur (represented by error block 619). If it is determined that the error may be avoided by performing image-based processing, the flow of operations may switch paths to the image-based data extraction including operations 624 and 626. Extraction failures may be detected by the text response validator 270 as described herein.

Image-based extraction in the flow of operations 600 may include retrieving (e.g., getting, obtaining, etc. to be passed to an LM) the relevant portion of the document identified in the operation 616 or a portion of the document corresponding to the relevant chunk (e.g., identified for retrieval in the operation 620) in the operation 624. The portion of the document corresponding to the relevant chunk may be used, for example, if the document having the relevant chunk was ingested using the text-based process. The portion of the document corresponding to the relevant chunk may be retrieved using the mapping. For example, the generative AI manager 260 and/or the prompt manager 262 may also perform the operation 620. The portion of the document retrieved may be appropriate for image-based extraction. The flow of operations 600 may also include prompting an MMLM with a request to extract particular information from the portion of the document retrieved in operation 626. For example, the prompt manager 262 and/or LM manager 268 may prompt the one or more MMLMs 110. In some embodiments, the portion of the document is converted to a file type accepted by the one or more MMLMs 110 (e.g., an image-based file type such as a PNG). In some embodiments, both the image-based portion of the document (e.g., page) and the relevant chunk (e.g., text extracted from the document) are provided to the one or more MMLMs 110. The one or more MMLMs 110, for example, may allow simultaneous input (e.g., by the same prompt) by two modalities or a first prompt may request that the MMLM store the text from the relevant chunk for consideration when responding to a second prompt that also includes the prompt to extract information and the image-based portion of the document (e.g., a second modality) associated with the relevant chunk.

Performing extraction using the image-based path (e.g., operations 624 and 626) is advantageous because it allows the information to be extracted using context including location of the text, figures, images, and other visual information. In some embodiments, the documents processed by the flow of operations 600 include forms, applications, surveys, etc. for which the document or portion thereof (e.g., page, section, etc.) includes a request for information. The document or portion thereof may also include one or more predefined responses. For example, the document or portion thereof may include multiple-choice, multiple-select, and/or ranking type questions. The one or more MMLMs 110 may be configured to recognize the selections of predefined responses from the respondent to the request for information. For example, the one or more MMLMs 110 may recognize circles around text, check marks, filled in boxes or bubbles, as a selection of the related text. In some embodiments, the MMLM is configured (e.g., trained, fine-tuned, etc.) to determine the portion of the text that represents the request for information (e.g., the question, survey directions, etc.) and determine the text that represents the predefined responses. The one or more MMLMs 110 may be configured or prompted to process (e.g., consider) this information separately when generating a response.

In some embodiments, the operation 626 includes prompting the MMLM to determine if a response was provided to the request for information in the document. If the MMLM determines that no response was provided, the flow of operations may generate a new request (e.g., an email, webform, etc.) for the respondent. The request may include the request for information and/or the request may be a reminder or an indication that no response was provided. Similar processing may be performed if the response is not appropriate of communicated using an incorrect method (e.g., circling text rather than filling in a bubble, etc.). For example, the operation 626 may also include prompting the MMLM to determine if an appropriate response was provided. The operation 626 may include generating a chain-of-thoughts prompt, first asking the MMLM to determine if a response was provided and, if a response was provided, asking the MMLM if the response was provided in an appropriate manner. After a new response is obtained from the respondent, the new response can be ingested (e.g., operations 602-614) and the extraction process (e.g., prompt) may be run again (e.g., the operations 616-626). The index and chunks for the new document (filled in request for information) may replace those created during ingestion of the incorrect or incomplete document.

In some embodiments, the flow of operations 600 includes storing the result from the LLM or the MMLM of the prompt. For example, the LM manager 268 may receive a response from the one or more LLMs 108 or the one or more MMLMs 110, the response validator 270 may validate the response, and/or the generative AI manager 260 may store the result in the response storage 272.

It is contemplated that systems performing the flow of operations 600 (e.g., the data extraction manager system 200) are not required to implement both text-based and image-based paths for both ingestion and extraction. At least one benefit of the disclosure herein is that the additional accuracy provided by image-based extraction using the one or more MMLMs 110 can be provided without significant computational expense incurred if all documents were ingested using the image-based approach. For example, this benefit may be provided by first storing a mapping between a chunk and a portion of a document and retrieving the original document or portion thereof (e.g., image, PDF, etc.) during extraction to be provided to the one or more MMLMs 110. Thus, only portions of documents considered relevant are processed by the one or more MMLMs 110. Additionally or alternatively, a data extraction process that already implements a fully text-based approach may not require that documents be re-ingested or the index of chunks be rebuilt.

In some embodiments, the text-based ingestion of the documents has already been performed. To save development time and overall system complexity, image-based ingestion may not be implemented by the data extraction manager system 200 and/or be available when performing the flow of operations 600. The configuration of the flow of operations 600 allows for modular approaches. For example, the decision 604 may always direct the flow of operations 600 to text-based ingestion if image-based ingestion has not yet been implemented in the data extraction manager system 200. It is noted that the decision 604 may not perform an active step. If image-based ingestion is not implemented, operational flow may automatically flow from operation 602 to the operation 606.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation.

Exemplary Embodiments

An embodiment of the present disclosure relates to a method for extracting particular information from a document. The method includes receiving, by one or more processors, a response payload that includes document text of the document and one or more tables of the document represented using markdown language. The response payload is generated from an optical character recognition tool. The method also includes separating, by the one or more processors using the markdown language, the response payload into a first portion having the one or more tables and a second portion having the document text. The method also includes forming, by the one or more processors using a chunking methodology, one or more table chunks from the first portion of the response payload and one or more text chunks from the second portion of the response payload. The method also includes identifying, by the one or more processors, a relevant table chunk of the one or more table chunks or a relevant text chunk of the one or more text chunks based on a search criterion related to a prompt for a large language model. The method also includes storing a response from the large language model to the prompt and the relevant table chunk or the relevant text chunk.

In some embodiments, the method also includes identifying, by the one or more processors, the first portion of the response payload having the one or more tables using a text-based search for sequences of characters used by the markdown language.

In some embodiments, the text-based search includes using regular expressions.

In some embodiments, the markdown language includes markdown symbols that separate the one or more tables from the document text.

In some embodiments, the markdown symbols indicate one or more boundaries of the one or more tables.

In some embodiments, the method also includes generating, by the one or more processors, an index for the one or more table chunks and the one or more text chunks. Generating the index includes converting the one or more table chunks and the one or more text chunks into vector text embeddings using a text embedding model. The search criterion includes a distance between the vector text embeddings and a prompt embedding of the prompt using the text embedding model.

In some embodiments, the search criterion includes a keyword search of row or column headers of the one or more table chunks.

In some embodiments, the method also includes associating, by the one or more processors, a document identifier for the document and a page identifier for a page of the document with each of the one or more table chunks and the one or more text chunks.

In some embodiments, the method also includes storing the document identifier and the page identifier associated with the relevant table chunk or the relevant text chunk with the prompt responsive to an error indicated by the large language model.

In some embodiments, the document is in a portable document format (PDF).

In some embodiments, the method also includes requesting, by the one or more processors, one or more data elements related to the particular information to be populated in a data store by sending the prompt to the large language model.

Another embodiment of the present disclosure relates to a method for preparing a document for retrieval augmentation. The method includes receiving, by one or more processors, a response payload that includes document text of the document and one or more tables of the document represented using markdown language, wherein the response payload is generated from an optical character recognition tool. The method also includes separating, by the one or more processors using the markdown language, the response payload into a first portion having the one or more tables and a second portion having the document text. The method also includes forming, by the one or more processors using a chunking methodology, one or more table chunks from the first portion of the response payload and one or more text chunks from the second portion of the response payload. The method also includes generating, by the one or more processors, an index for the one or more table chunks and the one or more text chunks. Generating the index includes converting the one or more table chunks and the one or more text chunks into vector text embeddings using a text embedding model and entries of the index that satisfy a distance criterion with a prompt for a large language model are relevant for the prompt.

In some embodiments, the method also includes identifying, by the one or more processors, the first portion of the response payload having the one or more tables using a text-based search for sequences of characters used by the markdown language.

In some embodiments, the text-based search includes using regular expressions.

In some embodiments, the markdown language includes markdown symbols that separate the one or more tables from the document text.

In some embodiments, the markdown symbols indicate one or more boundaries of the one or more tables.

In some embodiments, the method also includes identifying, by the one or more processors, a relevant table chunk of the one or more table chunks or a relevant text chunk of the one or more text chunks based on the distance criterion. The method also includes storing a result from the large language model in response to the prompt and the relevant table chunk.

In some embodiments, the method also includes associating, by the one or more processors, a document identifier for the document and a page identifier for a page of the document with each of the one or more table chunks and the one or more text chunks and storing the document identifier and the page identifier associated with the relevant table chunk or the relevant text chunk with the prompt responsive to an error indicated by the large language model.

In some embodiments, the method also includes identifying, by the one or more processors, a relevant table chunk of the one or more table chunks based on a keyword search of row or column headers of the one or more table chunks.

Another embodiment of the present disclosure relates to a system for extracting particular information from a document. The system includes one or more processors and one or more tangible, non-transitory memories configured to communicate with the one or more processors. The one or more tangible, non-transitory memories having instructions stored thereon that, in response to execution by the one or more processors, cause the one or more processors to perform operations. The operations include receiving a response payload that includes document text of the document and one or more tables of the document represented using markdown language, wherein the response payload is generated from an optical character recognition tool. The operations also include separating, using the markdown language, the response payload into a first portion having the one or more tables and a second portion having the document text. The operations also include forming, using a chunking methodology, one or more table chunks from the first portion of the response payload and one or more text chunks from the second portion of the response payload. The operations also include identifying a relevant table chunk of the one or more table chunks or a relevant text chunk of the one or more text chunks based on a search criterion related to a prompt for a large language model. The operations also include storing a response from the large language model to the prompt and the relevant table chunk or the relevant text chunk.

Another embodiment of the present disclosure relates to a method for document retrieval within retrieval augmented generation. The method includes acquiring, by one or more processors, an extraction prompt to cause a large language model to extract information from provided text. The method also includes identifying, by the one or more processors, one or more relevant chunks according to retrieval parameters associated with the extraction prompt. The one or more relevant chunks are identified from an index of one or more chunks from one or more documents, the index including vector text embeddings of the one or more chunks. The method also includes storing a response from the large language model to the extraction prompt and the one or more relevant chunks.

In some embodiments, the method also includes forming, by the one or more processors, one or more table chunks having tabular data of the one or more documents and one or more text chunks having text data of the one or more documents. The retrieval parameters include a chunk type designation indicating the one or more relevant chunks are to be retrieved from the one or more table chunks, the one or more text chunks, or both the one or more table chunks and the one or more text chunks.

In some embodiments, the method also includes receiving, by the one or more processors, a response payload that includes document text of a document of the one or more documents and one or more tables of the document represented using markdown language. The response payload is generated from an optical character recognition tool. The method also includes separating, by the one or more processors using the markdown language, the response payload into a first portion having the one or more tables and a second portion having the document text. Forming the one or more table chunks is based on the first portion and forming the one or more text chunks is based on the second portion.

In some embodiments, the retrieval parameters include a search type designation indicating the one or more relevant chunks are to be searched using a semantic search, a keyword search, or both the semantic search and the keyword search.

In some embodiments, the method also includes generating, by the one or more processors, distance metrics between the vector text embeddings and a vector text embedding of the extraction prompt and generating, by the one or more processors, keyword scores between the one or more chunks and a keyword associated by the extraction prompt. The retrieval parameters include weighting parameters for a weighted function of the keyword scores and the distance metrics and retrieving the one or more relevant chunks is based on the weighted function of the keyword scores and the distance metrics.

In some embodiments, the method also includes generating, by the one or more processors, match scores for the one or more chunks using a text-based search. The retrieval parameters include one or more regular expressions to perform the text-based search.

In some embodiments, the retrieval parameters include a document type designation indicating one or more document types from where the one or more relevant chunks are to originate.

In some embodiments, the retrieval parameters include a search reach criterion. One or more reached chunks that satisfy the search reach criterion with a relevant chunk of the one or more relevant chunks are provided to the large language model.

In some embodiments, the retrieval parameters include a hierarchy of sets of the retrieval parameters. Identifying the one or more relevant chunks according to the retrieval parameters includes identifying, by the one or more processors, the one or more relevant chunks according to a first set of retrieval parameters of the hierarchy; determining, by the one or more processors, whether the one or more relevant chunks satisfy a retrieval criterion; and responsive to determining that the one or more relevant chunks do not satisfy the retrieval criterion, identifying, by the one or more processors, the one or more relevant chunks according to a second set of retrieval parameters of the hierarchy.

Another embodiment of the present disclosure relates to a system for document retrieval within retrieval augmented generation. The system includes one or more processors and one or more memories storing instructions that, when executed by the one or more processors, cause the system to perform operations. The operations include acquiring an extraction prompt to cause a large language model to extract information from provided text. The operations also include identifying one or more relevant chunks according to retrieval parameters associated with the extraction prompt. The one or more relevant chunks are identified from an index of one or more chunks of one or more documents. The index includes vector text embeddings of the one or more chunks. The operations also include storing a response from the large language model to the extraction prompt and the one or more relevant chunks.

In some embodiments, the operations also include forming, by the one or more processors, one or more table chunks having tabular data of the one or more documents and one or more text chunks having text data of the one or more documents. The retrieval parameters include a chunk type designation indicating the one or more relevant chunks are to be retrieved from the one or more table chunks, the one or more text chunks, or both the one or more table chunks and the one or more text chunks.

In some embodiments, the operations also include receiving a response payload that includes document text of a document of the one or more documents and one or more tables of the document represented using markdown language. The response payload is generated from an optical character recognition tool. The operations also include separating, using the markdown language, the response payload into a first portion having the one or more tables and a second portion having the document text. Forming the one or more table chunks is based on the first portion and forming the one or more text chunks is based on the second portion.

In some embodiments, the retrieval parameters include a search type designation indicating the one or more relevant chunks are to be searched using a semantic search, a keyword search, or both the semantic search and the keyword search.

In some embodiments, the operations also include generating distance metrics between the vector text embeddings and a vector text embedding of the extraction prompt and generating keyword scores between the one or more chunks and a keyword associated with the extraction prompt. The retrieval parameters include weighting parameters for a weighted function of the keyword scores and the distance metrics and retrieving the one or more relevant chunks is based on the weighted function of the keyword scores and the distance metrics.

In some embodiments, the operations also include generating match scores for the one or more chunks using a text-based search, wherein the retrieval parameters include one or more regular expressions to perform the text-based search.

In some embodiments, the retrieval parameters include a document type designation indicating one or more document types from where the one or more relevant chunks are to originate.

In some embodiments, the retrieval parameters include a search reach criterion. One or more reached chunks that satisfy the search reach criterion with a relevant chunk of the one or more relevant chunks are provided to the large language model.

In some embodiments, the retrieval parameters include a hierarchy of sets of the retrieval parameters. Identifying the one or more relevant chunks according to the retrieval parameters includes identifying the one or more relevant chunks according to a first set of retrieval parameters of the hierarchy; determining whether the one or more relevant chunks satisfy a retrieval criterion; and responsive to determining that the one or more relevant chunks do not satisfy the retrieval criterion, identifying the one or more relevant chunks according to a second set of retrieval parameters of the hierarchy.

Another embodiment of the present disclosure relates to a non-transitory computer-readable medium storing instructions that, when executed by one or more processors, cause the one or more processors to generate an index for one or more chunks of one or more documents. Generating the index includes converting the one or more chunks into vector text embeddings using a text embedding model. The instructions also cause the one or more processors to acquire an extraction prompt configured to cause a large language model to extract requested data from retrieved chunks of the one or more chunks. The instructions also cause the one or more processors to identify one or more relevant chunks according to a first set of retrieval parameters associated with the extraction prompt. The instructions also cause the one or more processors to determine whether the one or more relevant chunks satisfy a retrieval criterion. The instructions also cause the one or more processors to identify the one or more relevant chunks according to a second set of retrieval parameters associated with the extraction prompt responsive to determining that the one or more relevant chunks do not satisfy the retrieval criterion and to store a response from the large language model to the extraction prompt and the one or more relevant chunks.

In some embodiments, the second set of retrieval parameters includes a search reach criterion, wherein one or more reached chunks that satisfy the search reach criterion with a relevant chunk of the one or more relevant chunks are provided to the large language model.

An embodiment of the present disclosure relates to a method for providing traceability in large language model responses. The method includes generating, by one or more processors, a plurality of chunks from a document. The method also includes associating, by the one or more processors, (i) a document identifier for the document and a page identifier or (ii) a chunk identifier for each chunk of the plurality of chunks. The method also includes identifying, by the one or more processors, one or more relevant chunks from the plurality of chunks based on a search criterion. The method also includes transmitting, by the one or more processors to a large language model, a prompt including (i) a first request to extract particular information using the one or more relevant chunks, (ii) the one or more relevant chunks, and (iii) a second request for the large language model to identify used chunks of the one or more relevant chunks used to extract the particular information. The method also includes storing the particular information from a response to the prompt from the large language model with (i) the document identifiers associated with the used chunks and the page identifiers associated with the used chunks or (ii) the chunk identifiers for the used chunks.

In some embodiments, the method also includes generating by the one or more processors, a user interface including the particular information and a citation to the document generated from (i) the document identifiers associated with the used chunks and the page identifiers associated with the used chunks or (ii) the chunk identifiers for the used chunks.

In some embodiments, the method also includes detecting, by the one or more processors, an error condition in the response from the large language model. Generating the user interface including the particular information and the citation to the document is responsive to detecting the error condition.

In some embodiments, the method also includes generating, by the one or more processors, a report document including the particular information and a citation to the document generated (i) the document identifiers associated with the used chunks and the page identifiers associated with the used chunks or (ii) the chunk identifiers for the used chunks.

In some embodiments, the plurality of chunks includes table chunks and text chunks. The method also includes associating, by the one or more processors, a chunk type for each respective chunk of the plurality of chunks, the chunk type indicating that a respective chunk includes tabular data or text data.

In some embodiments, the method also includes generating, by the one or more processors, a citation list based on the document identifiers and page identifiers associated with the used chunks and storing the citation list with the particular information from the response.

In some embodiments, the method also includes recording a timestamp for each chunk used by the large language model and storing the timestamp with the particular information from the response.

In some embodiments, the prompt also includes a third request to output an error condition encountered by the large language model.

In some embodiments, the document is in a portable document format (PDF).

Another embodiment of the present disclosure relates to a system for maintaining traceability in document processing. The system includes one or more processors and one or more memories storing instructions that, when executed by the one or more processors, cause the system to implement an ingestion manager. The ingestion manager is configured to generate a plurality of chunks from documents received for processing, assign unique identifiers to each chunk of the plurality of chunks, and maintain a traceability database storing relationships between chunk identifiers; source document identifiers; page location identifiers; and chunk content. The instructions also cause the system to implement a retrieval manager configured to identify one or more relevant chunks from the plurality of chunks based on a search criterion and retrieve traceability information for the one or more relevant chunks. The instructions also cause the system to implement a generative artificial intelligence manager. The generative artificial intelligence manager is configured to transmit, to a large language model, a prompt including a first request to extract particular information using the one or more relevant chunks, the one or more relevant chunks, and a second request for the large language model to identify used chunks of the one or more relevant chunks used to extract the particular information, receive a response from the large language model, and store in a data store the response; the chunk identifiers of the used chunks used by the large language model to generate the response; the source document identifiers associated with the used chunks; and the page location identifiers associated with the used chunks.

In some embodiments, the generative artificial intelligence manager is further configured to receive, from the large language model, the chunk identifiers of the used chunks, wherein the used chunks are a subset of the one or more relevant chunks.

In some embodiments, the ingestion manager is further configured to separate table chunks from text chunks and maintain separate traceability records for the table chunks and the text chunks.

In some embodiments, the retrieval manager is further configured to record retrieval timestamps; track the one or more relevant chunks that are provided to the large language model; and maintain a usage history for each chunk of the plurality of chunks.

In some embodiments, the generative artificial intelligence manager is further configured to detect error conditions in the response; retrieve the chunk content from the used chunks for verification; and generate error reports including the source document identifiers associated with the used chunks and the page location identifiers associated with the used chunks.

In some embodiments, the ingestion manager is further configured to generate globally unique identifiers for each chunk of the plurality of chunks; maintain version history of each chunk of the plurality of chunks when the documents are updated; and link chunks from different versions of a same document.

In some embodiments, the generative artificial intelligence manager is further configured to generate formatted citations including the source document identifiers associated with the used chunks and the page location identifiers associated with the used chunks; and store the formatted citations with the response in the data store.

Another embodiment relates to a non-transitory computer-readable medium storing instructions that, when executed by one or more processors, cause the one or more processors to generate a plurality of chunks from documents received for processing. The instructions also cause the one or more processors to create and store traceability records including chunk identifiers; source document identifiers; page location identifiers; chunk type designation; and chunk content, wherein the chunk type designation indicates whether a chunk of the plurality of chunks contains tabular data or text data. The instructions also cause the one or more processors to identify one or more relevant chunks from the plurality of chunks based on a search criterion. The instructions also cause the one or more processors to receive a response from a large language model to a prompt including the one or more relevant chunks. The response including used chunks of the one or more relevant chunks used by the large language model to extract particular information requested by the prompt. The instructions also cause the one or more processors to store in data store the response: the chunk identifiers of the used chunks used by the large language model to generate the response; the source document identifiers associated with the used chunks; and the page location identifiers associated with the used chunks.

In some embodiments, the instructions also cause the one or more processors to detect error conditions in the response;

retrieve the chunk content from the used chunks for verification; and generate error reports including the source document identifiers associated with the used chunks and the page location identifiers associated with the used chunks.

In some embodiments, the instructions also cause the one or more processors to maintain a version history of each chunk of the plurality of chunks when the documents are updated and link chunks from different versions of a same document.

In some embodiments, the traceability records also include: creation timestamps; last access timestamps; usage counts; and error flags.

Another embodiment relates to a method for extracting particular information from a document. The method includes receiving, by one or more processors, a payload that includes document text from the document, wherein the payload is generated from an optical character recognition tool. The method also includes generating, by the one or more processors, one or more chunks from the document text, a respective chunk of the one or more chunks associated with a corresponding portion of the document. The method also includes identifying, by the one or more processors, a relevant chunk of the one or more chunks based on a search criterion related to a first prompt to extract the particular information. The method also includes providing, by the one or more processors, the first prompt or a second prompt based on the first prompt to a multi-modal language model, with the corresponding portion of the document associated with the relevant chunk. The method also includes storing a result from the multi-modal language model to the first prompt or the second prompt provided.

In some embodiments, the document includes one or more image-based portions. The method also includes storing a mapping between the respective chunk and an image-based portion of the one or more image-based portions including the document text from the respective chunk. The method also includes retrieving, by the one or more processors, the corresponding portion of the document based on the mapping.

In some embodiments, the document is in a portable document format (PDF).

In some embodiments, the first prompt or the second prompt provided to the multi-modal language model includes a step prompting the multi-modal language model to determine whether a response has been provided to a request for information in the relevant chunk.

In some embodiments, the document includes a request for information and a response to the request for the information.

In some embodiments, the method also includes at least one of determining, by the one or more processors, whether the response to the request is appropriate. The method also includes generating a step in the first prompt or the second prompt provided to the multi-modal language model including a request for the multi-modal language model to determine whether the response to the request is appropriate.

In some embodiments, the method also includes separating, by the one or more processors, the document text into request text related to the request for the information and other text. Generating the one or more chunks includes generating request chunks from the request text, and the search criterion indicates a search of the request chunks.

In some embodiments, the document also includes a plurality of predefined responses.

In some embodiments the response includes a ranking of the plurality of predefined responses.

In some embodiments the response includes a selection from the plurality of predefined responses, the selection indicated by at least one of: a mark within a shape proximate a selected response; a mark enclosing the selected response; or a mark proximate the selected response.

In some embodiments, at least one of the plurality of predefined responses includes a Likert scale.

In some embodiments, at least one of the plurality of predefined responses includes a numerical range.

In some embodiments, the response includes handwritten characters.

In some embodiments, the method also includes separating, by the one or more processors, sections of the document indicated in the payload. Generating the one or more chunks is based on the sections of the document.

An embodiment relates to a system for extracting particular information from a document, the system including one or more processing circuits configured to receive a payload that includes document text from the document, wherein the payload is generated from an optical character recognition tool. The processing circuits also are configured to generate one or more chunks from the document text, a respective chunk of the one or more chunks associated with a corresponding portion of the document. The processing circuits also are configured to identify a relevant chunk of the one or more chunks based on a search criterion related to a first prompt to extract the particular information. The processing circuits also are configured to provide the first prompt or a second prompt based on the first prompt to a multi-modal language model, with the corresponding portion of the document associated with the relevant chunk. The processing circuits also are configured to store a result from the multi-modal language model to the first prompt or the second prompt provided.

In some embodiments, the document includes one or more image-based portions, and the one or more processing circuits are configured to store a mapping between the respective chunk and an image-based portion of the one or more image-based portions including the document text from the respective chunk. The processing circuits also are configured to retrieve the corresponding portion of the document based on the mapping.

In some embodiments, the first prompt or the second prompt provided to the multi-modal language model include a step prompting the multi-modal language model to determine whether a response has been provided to a request for information in the relevant chunk.

In some embodiments, the document includes a request for information, a plurality of predefined responses, and a selection of a predefined response.

In some embodiments the one or more processing circuits are also configured to separate the document text into request text related to the request for the information and other text. Generating the one or more chunks includes generating request chunks from the request text, and the search criterion indicates a search of the request chunks.

An embodiment relates to a system for extracting particular information from an image-based document, the system includes one or more processors and one or more one or more tangible, non-transitory memories configured to communicate with the one or more processors. The one or more tangible, non-transitory memories having instructions stored thereon that, in response to execution by the one or more processors, cause the one or more processors to receive a payload that includes document text from the image-based document, wherein the payload is generated from an optical character recognition tool. The one or more processors also generate one or more chunks from the document text. The one or more processors also store, for each respective chunk of the one or more chunks, a corresponding page of the image-based document, the corresponding page including the document text of the respective chunk. The one or more processors also identify a relevant chunk of the one or more chunks based on a search criterion related to a first prompt to extract the particular information. The one or more processors also retrieve the corresponding page for the relevant chunk. The one or more processors also provide the first prompt or a second prompt based on the first prompt to a multi-modal language model, with the corresponding page of the image-based document associated with the relevant chunk. The one or more processors also store a result from the multi-modal language model to the first prompt or the second prompt provided.

These embodiments are illustrative only and should not be considered limiting.

What is claimed is:

1. A method for extracting particular information from a document, the method comprising:

receiving, by one or more processors, a payload that includes document text from the document, wherein the payload is generated from an optical character recognition tool;

generating, by the one or more processors, one or more chunks from the document text, a respective chunk of the one or more chunks associated with a corresponding portion of the document;

storing a mapping between the respective chunk and an image-based portion of the document comprising the document text from the respective chunk;

identifying, by the one or more processors, a relevant chunk of the one or more chunks based on a search criterion related to a first prompt to extract the particular information;

retrieving, by the one or more processors, the corresponding portion of the document based on the mapping, wherein the corresponding portion of the document comprises an image-based representation of a page of the document;

providing, by the one or more processors, the first prompt or a second prompt based on the first prompt to a multi-modal language model, with the corresponding portion of the document retrieved based on the mapping and associated with the relevant chunk; and storing a result from the multi-modal language model to the first prompt or the second prompt provided.

2. The method of claim 1, wherein the document comprises one or more image-based portions, and wherein the document is in a portable document format (PDF).

3. The method of claim 1, wherein the first prompt or the second prompt provided to the multi-modal language model comprises a step prompting the multi-modal language model to determine whether a response has been provided to a request for information in the relevant chunk.

4. The method of claim 1, wherein the document comprises a request for information and a response to the request for the information.

5. The method of claim 4, further comprising at least one of:

determining, by the one or more processors, whether the response to the request is appropriate; or generating a step in the first prompt or the second prompt provided to the multi-modal language model comprising a request for the multi-modal language model to determine whether the response to the request is appropriate.

6. The method of claim 4, the method further comprising separating, by the one or more processors, the document text into request text related to the request for the information and other text, wherein generating the one or more chunks comprises generating request chunks from the request text, and wherein the search criterion indicates a search of the request chunks.

7. The method of claim 4, wherein the document further comprises a plurality of predefined responses.

8. The method of claim 7, wherein the response comprises a ranking of the plurality of predefined responses.

9. The method of claim 7, wherein the response comprises a selection from the plurality of predefined responses, the selection indicated by at least one of:

a mark within a shape proximate a selected response;

a mark enclosing the selected response; or a mark proximate the selected response.

10. The method of claim 7, wherein at least one of the plurality of predefined responses comprises a Likert scale.

11. The method of claim 7, wherein at least one of the plurality of predefined responses comprises a numerical range.

12. The method of claim 4, wherein the response comprises handwritten characters.

13. The method of claim 1, the method further comprising separating, by the one or more processors, sections of the document indicated in the payload, wherein generating the one or more chunks is based on the sections of the document.

14. A system for extracting particular information from a document, the system comprising one or more processing circuits configured to:

receive a payload that includes document text from the document, wherein the payload is generated from an optical character recognition tool;

generate one or more chunks from the document text, a respective chunk of the one or more chunks associated with a corresponding portion of the document;

store a mapping between the respective chunk and an image-based portion of the document comprising the document text from the respective chunk;

identify a relevant chunk of the one or more chunks based on a search criterion related to a first prompt to extract the particular information;

retrieve the corresponding portion of the document based on the mapping, wherein the corresponding portion of the document comprises an image-based representation of a page of the document;

provide the first prompt or a second prompt based on the first prompt to a multi-modal language model, with the corresponding portion of the document retrieved based on the mapping and associated with the relevant chunk; and store a result from the multi-modal language model to the first prompt or the second prompt provided.

15. The system of claim 14, wherein the document comprises one or more image-based portions, and wherein the document is in a portable document format (PDF).

16. The system of claim 14, wherein the first prompt or the second prompt provided to the multi-modal language model comprises a step prompting the multi-modal language model to determine whether a response has been provided to a request for information in the relevant chunk.

17. The system of claim 14, wherein the document comprises a request for information, a plurality of predefined responses, and a selection of a predefined response.

18. The system of claim 17, the one or more processing circuits configured to separate the document text into request text related to the request for the information and other text, wherein generating the one or more chunks comprises generating request chunks from the request text, and wherein the search criterion indicates a search of the request chunks.

19. A system for extracting particular information from an image-based document, the system comprising:

one or more processors; and one or more tangible, non-transitory memories configured to communicate with the one or more processors, the one or more tangible, non-transitory memories having instructions stored thereon that, in response to execution by the one or more processors, cause the one or more processors to:

receive a payload that includes document text from the image-based document, wherein the payload is generated from an optical character recognition tool;

generate one or more chunks from the document text;

store, for each respective chunk of the one or more chunks, a mapping between the respective chunk and a corresponding page of the image-based document, the corresponding page comprising the document text of the respective chunk;

identify a relevant chunk of the one or more chunks based on a search criterion related to a first prompt to extract the particular information;

retrieve the corresponding page for the relevant chunk based on the mapping, wherein the corresponding portion of the document comprises an image-based representation of a page of the document;

provide the first prompt or a second prompt based on the first prompt to a multi-modal language model, with the corresponding page of the image-based document retrieved based on the mapping and associated with the relevant chunk; and store a result from the multi-modal language model to the first prompt or the second prompt provided.

20. The method of claim 1, wherein the multi-modal language model comprises an image encoder module configured to process the image-based representation of the page of the document.

21. The method of claim 1, further comprising preserving, by the one or more processors, original page layout metadata associated with the image-based representation of the page of the document.

22. The method of claim 1, wherein providing the first prompt or the second prompt to the multi-modal language model comprises providing both the relevant chunk and the image-based representation of the page of the document jointly to the multi-modal language model.

23. The method of claim 1, wherein the image-based representation of the page of the document is used to resolve ambiguities in the document text extracted by the optical character recognition tool.

24. The system of claim 14, wherein the multi-modal language model comprises an image encoder module configured to process the image-based representation of the page of the document.

25. The system of claim 14, the one or more processing circuits further configured to preserve original page layout metadata associated with the image-based representation of the page of the document.

26. The system of claim 14, wherein providing the first prompt or the second prompt to the multi-modal language model comprises providing both the relevant chunk and the image-based representation of the page of the document jointly to the multi-modal language model.

27. The system of claim 14, wherein the image-based representation of the page of the document is used to resolve ambiguities in the document text extracted by the optical character recognition tool.

28. The system of claim 19, wherein the multi-modal language model comprises an image encoder module configured to process the image-based representation of the corresponding page of the image-based document.

29. The system of claim 19, the instructions further causing the one or more processors to preserve original page layout metadata associated with the image-based representation of the corresponding page of the image-based document.

30. The system of claim 19, wherein providing the first prompt or the second prompt to the multi-modal language model comprises providing both the relevant chunk and the image-based representation of the corresponding page of the image-based document jointly to the multi-modal language model.

31. The system of claim 19, wherein the image-based representation of the corresponding page of the image-based document is used to resolve ambiguities in the document text extracted by the optical character recognition tool.

\* \* \* \* \*